с

US008710271B2

(12) United States Patent
Yilmaz et al.

(10) Patent No.: US 8,710,271 B2
(45) Date of Patent: Apr. 29, 2014

(54) PROCESS FOR THE PRODUCTION OF AN ACYLATION CATALYST

(75) Inventors: Bilge Yilmaz, New York, NY (US);
Ulrich Müller, Neustadt (DE); Faruk Özkirim, Ludwigshafen (DE); Takashi Tatsumi, Kawasaki (JP); Feng-Shou Xiao, Changchun (CN); Dirk de Vos, Holsbeek (BE); Xinhe Bao, Dalian (CN); Weiping Zhang, Dalian (CN); Hermann Gies, Sprockhövel, DE (US); Hiroyuki Imai, Tokyo (JP); Bart Tijsebaert, Sint-Andries (BE)

(73) Assignees: BASF SE, Ludwigshafen (DE); Tokyo Institute of Technology, Tokyo (JP)

( * ) Notice: Subject to any disclaimer, the term of this patent is extended or adjusted under 35 U.S.C. 154(b) by 0 days.

(21) Appl. No.: 13/438,316

(22) Filed: Apr. 3, 2012

(65) Prior Publication Data

US 2012/0259141 A1 Oct. 11, 2012

(30) Foreign Application Priority Data

Apr. 8, 2011 (WO) ................ PCT/CN2011/072548

(51) Int. Cl.
*C07C 45/41* (2006.01)
*C01B 39/00* (2006.01)
(52) U.S. Cl.
USPC ............ 568/319; 423/709; 423/714; 423/718
(58) Field of Classification Search
USPC ............................ 568/319; 423/709, 714, 718
See application file for complete search history.

(56) References Cited

U.S. PATENT DOCUMENTS

| 3,308,069 A | 3/1967 | Wadlinger et al. |
| 4,554,145 A | 11/1985 | Rubin |
| 4,642,226 A | 2/1987 | Calvert et al. |
| 5,139,759 A | 8/1992 | Cannan et al. |
| 6,194,616 B1 | 2/2001 | Spagnol et al. |

FOREIGN PATENT DOCUMENTS

| CN | 1179994 | 4/1998 |
| WO | WO 97/48665 | 12/1997 |
| WO | WO 2010146156 | 12/2010 |

OTHER PUBLICATIONS

"International Search Report of PCT/IB2012/051627", dated Aug. 30, 2012, 15 pgs.
Majano, Gerardo et al., "Al-Rich Zeolite Beta by Seeding in the Absence of Organic Template", *Chem. Mater.*, vol. 21, No. 18 2009, pp. 4184-4191.
Xie, Bin et al., "Organotemplate-Free and Fast Route for Synthesizing Beta Zeolite", *Chemistry of Materials*, vol. 20, N. 14 2008, pp. 4533-4535.
Burwell, Robert L., "Definitions, Terminology and Symbols in Colloid and Surface Chemistry, Part II: Heterogeneous Catalysis", *Terminology for Physicochemical Quantities and Units—Appendix II* Pure & Appl. Chem, vol. 46 1976, pp. 71-90.
Campbell, Branton J. et al., "The Synthesis of the New Zeolite, ERS-7, and the Determination of its Structure by Simulated Annealing and Synchrotron X-ray Powder Diffraction", *Chem. Commun.* 1998, pp. 1725-1726.
Xie, Bin et al., "Seed-directed Synthesis of Zeolites With Enhanced Performance in the Absence of Organic Templates", *Chem. Comm.*, vol. 47 2011, pp. 3945-3947.

*Primary Examiner* — Sikarl Witherspoon
(74) *Attorney, Agent, or Firm* — Servilla Whitney LLC

(57) ABSTRACT

The present invention relates to a process for the preparation of a zeolitic material having a BEA framework structure comprising the steps of: (i) providing one or more zeolitic materials having a BEA framework structure, wherein the BEA framework structure comprises $YO_2$ and $X_2O_3$, wherein Y is a tetravalent element, and X is a trivalent element; (ii) subjecting the one or more zeolitic materials provided in step (i) to a procedure for removing at least a portion of X, preferably tetrahedrally coordinated X, from the BEA framework structure; wherein the Y:X molar ratios of the one or more zeolitic materials provided in step (i) are respectively comprised in the range of from 1 to 50.

39 Claims, 6 Drawing Sheets

US 8,710,271 B2

PROCESS FOR THE PRODUCTION OF AN ACYLATION CATALYST

CROSS-REFERENCE TO RELATED APPLICATIONS

This application claims priority under 35 U.S.C. §365(c) to PCT application PCT/CN/2011/072548, filed on Apr. 8, 2011, which is incorporated herein by reference in its entirety.

TECHNICAL FIELD

The present invention relates to a zeolitic material having a BEA framework structure and to a method for its production, as well as to a process for the acylation of an organic compound including the use of a catalyst comprising a zeolitic material having a BEA framework structure in an acylation reaction.

BACKGROUND

The most prominent and best studied example for a zeolitic material with U.S.C. a BEA framework structure is zeolite Beta, which is a zeolite containing $SiO_2$ and $Al_2O_3$ in its framework and is considered to be one of the most important nanoporous catalysts with its three-dimensional 12-membered-ring (12MR) pore/channel system and has been widely used in petroleum refining and fine chemical industries. Zeolite Beta was first described in U.S. Pat. No. 3,308,069 and involved the use of the tetraethylammonium cation as the structure directing agent. Although numerous alterations and improvements had since then been made to the preparation procedure, including the use of other structure directing agents such as dibenzyl-1,4-diazabicyclo[2,2,2]octane in U.S. Pat. No. 4,554,145 or dibenzylmethylammonium in U.S. Pat. No. 4,642,226, the known processes for its preparation still relied on the use of organic template compounds. In U.S. Pat. No. 5,139,759, for example, it is reported that the absence of an organic template compound in the synthetic procedure of zeolite Beta leads to the crystallization of ZSM-5 instead.

Recently, however, it has surprisingly been discovered that zeolite Beta and related materials may be prepared in the absence of the organotemplates which until then had always been used as structure directing agent. Thus, in Xiao et al., Chem. Mater. 2008, 20, pp. 4533-4535 and Supporting Information, a process for the synthesis of zeolite Beta is shown, in which crystallization of an aluminosilicate gel is conducted using zeolite Beta seed crystals. In WO 2010/146156 A the organotemplate-free synthesis of zeolitic materials having the BEA framework structure, and in particular to the organotemplate-free synthesis of zeolite Beta is described. In Majano et al., Chem. Mater. 2009, 21, pp. 4184-4191, on the other hand, Al-rich zeolite Beta materials having Si/Al ratios as low as 3.9 are discussed which may be obtained from reactions employing seeding in the absence of organic templates. Besides the considerable advantage of not having to use costly organotemplates which required subsequent removal from the microporous framework by calcination, the new organotemplate-free synthetic methodologies further allowed for the preparation of Al-rich zeolite Beta with unprecedentedly low Si/Al ratios.

Although notable progress has been made in the recent past with respect to the synthesis of new zeolitic materials having the BEA framework structure, there still remains a considerable need for the provision of new zeolitic materials having improved characteristics. This applies in particular in view of the numerous catalytic applications in which they are currently used. In this respect, WO 97/48665 A1 and the references cited therein might be mentioned, wherein the highly advantageous and particularly preferred use of zeolite Beta as a catalyst in a process for the acylation of an aromatic compound is described. Furthermore there is an ongoing need in the development of new and improved zeolitic materials which may advantageously be employed in existing and future catalytic applications.

SUMMARY

Embodiments of the present invention are directed to a process for the preparation of a zeolitic material having a BEA framework structure comprising the steps of: (i) providing one or more zeolitic materials having a BEA framework structure, wherein the BEA framework structure comprises $YO_2$ and $X_2O_3$, wherein Y is a tetravalent element, and X is a trivalent element; (ii) subjecting the one or more zeolitic materials provided in step (i) to a procedure for removing at least a portion of X from the BEA framework structure; wherein the Y:X molar ratios of the one or more zeolitic materials provided in step (i) are respectively comprised in the range of from 1 to 50.

In one or more embodiments Y is selected from the group consisting of Si, Sn, Ti, Zr, Ge and combinations of two or more thereof; X is selected from the group consisting of Al, B, In, Ga and combinations of two or more thereof.

In one or more embodiments, the one or more zeolitic materials provided in step (i) are obtainable from an organotemplate-free synthetic process. The zeolitic materials can be non-calcined.

In one or more embodiments, the BET surface area determined according to DIN 66135 of the one or more zeolitic materials provided in step (i) ranges from 200 to 700 $m^2/g$.

In a specific embodiment, the one or more zeolitic materials comprise zeolite Beta. The one or more zeolitic materials provided in step (i) can comprise one or more alkali metals M. The molar ratio of M:X can range from 0.01 to 20. Prior to the procedure in step (ii), at least a portion of the alkali metal atoms M contained in the one or more zeolitic materials provided in step (i) can be exchanged with $H^+$ and/or $NH_4^+$. The ion-exchange process can be conducted at a pH in the range of from 0 to 7.

In one or more embodiments, the procedure in step (ii) for removing at least a portion of X from the BEA framework structure comprises one or more steam-treatment steps (S). The one or more steam-treatment steps (S) are conducted at a temperature of from 200 to 1,000° C. The one or more steam-treatment steps (S) can be conducted for a duration of from 0.1 to 48 h. The one or more steam-treatment steps (S) can be conducted using a steam concentration of from 5 to 75 vol-%. The procedure in step (ii) can further comprise subjecting the one or more zeolitic materials obtained from the one or more steam-treatment steps (S) to one or more acid-treatment steps (A). The one or more acid-treatment steps (A) involve contacting the one or more zeolitic materials with an acidic solution having a pH of 4 or less. The one or more acid-treatment steps (A) involve contacting the one or more zeolitic materials with an acidic solution at a temperature of from 50 to 100° C. The one or more acid-treatment steps (A) involve contacting the one or more zeolitic materials with an acidic solution for a period of from 0.25 to 5.

In one or more embodiments the procedure in step (ii) for removing at least a portion of X from the BEA framework structure comprises one or more calcinations steps (C). The one or more calcinations steps (C) can be conducted at a temperature of from 450 to 800° C. The one or more calcinations steps (C) can be conducted for a period ranging from 0.5 to 10 h.

In one or more embodiments, step (ii) is repeated one or more times. The repetition of step (ii) can comprise the repetition of one or more of the one or more calcinations steps (C). Prior to repeating step (ii), at least part of the non-framework ions respectively present in the one or more zeolitic materials are exchanged with one or more cations and/or cationic elements, wherein the one or more cation and/or cationic elements comprises $H^+$ and/or $NH_4^+$. The non-framework ions can comprise X.

Other embodiments of the present invention are directed to a zeolitic material having a BEA framework structure obtainable and/or obtained according the process of the invention.

A further embodiment of the present invention is directed to a zeolitic material having a BEA framework structure, optionally obtainable and/or obtained according to the process of the invention, wherein the BEA framework structure comprises $YO_2$ and $X_2O_3$, wherein Y is a tetravalent element, and X is a trivalent element, and wherein the $^1H$ MAS NMR of the zeolitic material comprises: a first peak (P1) in the range of from 0.40 to 1.00 ppm; a second peak (P2) in the range of from 1.40 to 2.00 ppm; and a third peak (P3) in the range of from 2.30 to 2.90 ppm; wherein the integration of the first, second, and third peaks in the $^1H$ MAS NMR of the zeolitic material offers a ratio of the integration values P1:P2:P3 of 1:(0.5-1.2):(0.30-2.5).

In one or more embodiments, the $^1H$ MAS NMR of the zeolitic material does not include a peak in the range of from 3.85 to 3.95 ppm, having an integration value of 100% or more of the integration value of the first, second, and/or third peaks. Y can be selected from the group consisting of Si, Sn, Ti, Zr, Ge, and combinations of two or more thereof. X can be selected from the group consisting of Al, B, In, Ga, and combinations of two or more thereof.

Other embodiments of the present invention are directed to a process for the acylation of an organic compound comprising: (a) providing a catalyst comprising one or more zeolitic materials having a BEA framework structure, (b) contacting the catalyst with one or more acylatable organic compounds in the presence of one or more acylating agents in one or more reactors for obtaining one or more acylated organic compounds, wherein the one or more zeolitic materials in the zeolitic material have a BEA framework structure according to embodiments of the present invention.

In one or more embodiments the one or more acylatable organic compounds comprises one or more acylatable aromatic compounds. The one or more acylating agents can comprise one or more compounds of the formula $R^1$—CO—X, wherein —CO— stands for a carbonyl moiety; $R^1$ is optionally substituted linear or branched, saturated or unsaturated $C_1$ to $C_8$; and X is selected among the group consisting of halogen, hydroxyl, and —O—CO—$R^2$, wherein $R^2$ has the same meaning as $R^1$ and wherein $R^2$ may be identical to or different than $R^1$.

A further embodiment of the present invention is directed to a method comprising a step of contacting one or more organic compounds with a zeolitic material having a BEA framework structure according to embodiments of the present invention for catalyzing a chemical reaction between one or more of the organic compounds. The conversion of the one or more organic compounds can be an acylation reaction.

DETAILED DESCRIPTION

Accordingly, present invention provides a new zeolitic material having novel characteristics and properties, in particular with respect to their use as a catalyst in chemical reactions. In view of said problem, it has surprisingly been found according to the present invention that a process which involves subjecting a zeolitic material having a BEA framework structure comprising both tetravalent and trivalent structural components Y and X as $YO_2$ and $X_2O_3$, respectively, to a procedure for removing X, and preferably tetravalently coordinated X from the framework structure affords a novel zeolitic material having highly advantageous properties. In addition thereto, it has further unexpectedly been found that such zeolitic materials may advantageously be used as catalysts, and in particular as acylation catalysts.

Thus, the present invention concerns a process for the preparation of a zeolitic material having a BEA framework structure comprising the steps of:

(i) providing one or more zeolitic materials having a BEA framework structure, wherein the BEA framework structure comprises $YO_2$ and $X_2O_3$, wherein Y is a tetravalent element, and X is a trivalent element;

(ii) subjecting the one or more zeolitic materials provided in step (i) to a procedure for removing at least a portion of X, preferably tetravalently coordinated X, from the BEA framework structure;

wherein the Y:X molar ratios of the one or more zeolitic materials provided in step (i) are respectively comprised in the range of from 1 to 50, preferably of from 1.5 to 35, more preferably of from 2 to 25, more preferably of from 2.5 to 15, more preferably of from 3 to 10, more preferably of from 3.5 to 7, more preferably of from 4 to 6, and even more preferably in the range of from 4 to 5.

Within the meaning of the present invention, $YO_2$ and optionally $X_2O_3$ comprised in the BEA framework structure of the one or more zeolitic materials provided in step (i) are contained therein as structure building elements, as opposed to non-framework elements which can be present in the pores and cavities formed by the framework structure and typical for zeolitic materials in general.

According to the present invention, there is no particular restriction as to the number and/or types of zeolitic materials which are provided in step (i) of the inventive process, provided that the have the BEA framework structure and comprise $YO_2$ and $X_2O_3$. Thus, by way of example, the one or more zeolitic materials may comprise one or more zeolites having the BEA framework structure which are selected from the group consisting of zeolite Beta, [B—Si—O]-BEA, [Ga—Si—O]-BEA, [Ti—Si—O]-BEA, Al-rich beta, CIT-6, tschernichite, and pure silica beta, wherein preferably the one or more zeolitic materials comprise zeolite Beta.

Furthermore, according to the present invention, Y comprised in the one or more zeolitic materials having a BEA framework structure stands for any conceivable tetravalent element, wherein Y is one or more tetravalent elements. In one or more embodiments, tetravalent elements include Si, Sn, Ti, Zr, and Ge, and combinations thereof. More preferably, Y stands for Si, Ti, or Zr, or any combination of said trivalent elements, even more preferably for Si and/or Sn. According to the present invention, it is particularly preferred that Y stands for Si.

Thus, according to specific embodiments of the present invention, Y comprised in the one or more zeolitic materials provided in step (i) is selected from the group consisting of Si, Sn, Ti, Zr, Ge, and combinations of two or more thereof, Y preferably being Si.

According to the present invention, the framework of the one or more zeolitic materials having a BEA structure comprises $X_2O_3$, wherein X stands for any conceivable trivalent element, X being one or more trivalent elements. In one or more embodiments, trivalent elements include Al, B, In, and Ga, and combinations thereof. More preferably, Y stands for Al, B, or In, or any combination of said trivalent elements, even more preferably for Al and/or B. According to the present invention, it is particularly preferred that X stands for Al.

Thus, according to specific embodiments of the present invention, X comprised in the one or more zeolitic materials provided in step (i) is selected from the group consisting of Al, B, In, Ga, and combinations of two or more thereof, X preferably being Al.

There is no particular restriction according to the present invention as to the combinations of $YO_2$ and $X_2O_3$ which are comprised in the one or more zeolitic materials having a BEA framework structure. Thus, in principle, any conceivable combination of one or more tetravalent elements Y in $YO_2$ may be comprised in one or more of the zeolitic materials in combination with one or more trivalent elements X in $X_2O_3$, wherein the aforementioned elements Y and X respectively refer to constitutive elements of the BEA framework structure. According to specific embodiments, however, the one or more tetravalent elements Y comprise Si, and the one or more trivalent elements X comprise Al, wherein even more preferably the one or more of the one or more zeolitic materials comprise $SiO_2$ and $Al_2O_3$.

As concerns the proportions of $YO_2$ to $X_2O_3$ which may be comprised in one or more of the one or more zeolitic materials having a BEA framework structure, in terms of the corresponding Y:X molar ratios, the one or more zeolitic materials generally display molar ratios ranging anywhere from 1 to 50. In one or more embodiments, the Y:X molar ratio of the tetravalent element Y to the trivalent element X ranges from 1.5 to 35, more preferably of from 2 to 25, more preferably of from 2.5 to 15, more preferably of from 3 to 10, more preferably of from 3.5 to 7, and even more preferably of from 4 to 6. According to specific embodiments, the Y:X molar ratio ranges from 4 to 5. Thus, according to specific embodiments of the present invention wherein one or more of the one or more zeolitic materials comprise $SiO_2$ and $Al_2O_3$, it is yet further preferred that the Si:Al molar ratio displayed by the framework structure is comprised in the range of from 1 to 50, preferably of from 1.5 to 35, more preferably of from 2 to 25, more preferably of from 2.5 to 15, more preferably of from 3 to 10, more preferably of from 3.5 to 7, more preferably of from 4 to 6, and even more preferably in the range of from 4 to 5.

In a specific embodiment, the one or more zeolitic materials provided in step (i) comprise one or more alkali metals M. In this respect, there is no particular restriction as to which specific alkali metal or which specific combinations of alkali metals may be comprised in the one or more zeolitic materials. It is however further preferred that the one or more alkali metals are selected from the group consisting of Li, Na, and K, wherein more preferably the one or more alkali metals are sodium and/or potassium. According to specific embodiments, the one or more zeolitic materials provided in step (i) comprise sodium.

Therefore, according to one or more embodiments, the one or more zeolitic materials provided in step (i) comprise one or more alkali metals M, preferably one or more alkali metals M selected from the group consisting of Li, Na, and K, wherein more preferably the one or more alkali metals M comprise Na and/or K, more preferably Na, and wherein even more preferably M is Na.

According to specific embodiments wherein the one or more zeolitic materials provided in step (i) comprise one or more alkali metals M, there is no general restriction as to the amount of the one or more alkali metals contained therein. Thus, in terms of the proportion of the one or more alkali metals M to $X_2O_3$ comprised in the one or more zeolitic materials, the molar ratio M:X of the one or more alkali metals to the one or more trivalent elements X may by example range anywhere from 0.01 to 20, wherein it is preferred that the M:X ratio be comprised in the range of from 0.05 to 10, more preferably of from 0.1 to 5, more preferably of from 0.5 to 2, more preferably of from 0.7 to 1.5, and even more preferably of from 0.8 to 1.3. According to specific embodiments, the molar ratio M:X displayed by the one or more zeolitic materials used in step (a) is comprised in the range of from 0.9 to 1.1.

Thus, according to specific embodiments wherein the one or more zeolitic materials provided in step (i) comprise one or more alkali metals M, the molar ratio of M:X preferably ranges from 0.01 to 20, preferably from 0.05 to 10, more preferably from 0.1 to 5, more preferably from 0.5 to 2, more preferably from 0.7 to 1.5, more preferably from 0.8 to 1.3, and even more preferably from 0.9 to 1.1.

In principle, there is no general restriction as to how the one or more zeolitic materials provided in step (i) are obtained, provided that they respectively have a BEA framework structure comprising $YO_2$ and $X_2O_3$ and that they display Y:X molar ratios comprised within the ranges and preferred ranges outlined in the foregoing. According to one or more embodiments, the zeolitic materials are provided from synthesis as opposed to being obtained from natural sources, wherein it is further preferred that the one or more zeolitic materials are obtainable from an organotemplate-free synthetic process. According to specific embodiments, the one or more zeolitic materials provided in step (i) are obtained from an organotemplate-free synthetic process.

Therefore, according to one or more embodiments, the one or more zeolitic materials provided in step (i) are obtainable, and preferably obtained, from an organotemplate-free synthetic process.

As regards the specific embodiments wherein the one or more zeolitic materials provided in step (i) are obtainable, and preferably obtained, from an organotemplate-free synthetic process, there is no particular restriction as to the synthetic procedure which may be used to this effect, provided that it does not employ an organotemplate as structure directing agent.

According to specific embodiments, the one or more zeolitic materials provided in step (i) are obtainable, and preferably obtained, according to a synthetic process for the organotemplate-free synthesis of a zeolitic material having a BEA framework structure, wherein said synthetic process comprises the steps of (1) preparing a mixture comprising seed crystals and one or more sources for $YO_2$; and
(2) crystallizing the mixture;
wherein when the BEA framework preferably comprises $X_2O_3$, the mixture according to step (1) further comprises one or more sources for $X_2O_3$.

According to said synthesis for providing the one or more zeolitic materials in step (i), at no point does the mixture provided in step (1) and crystallized in step (2) contain more than an impurity of an organic structure directing agent specifically used in the synthesis of the one or more zeolitic materials having a BEA framework structure, in particular specific tetraacylammonium salts and/or related organotemplates such as tetraethylammonium and/or dibenzylmethylammonium salts, and dibenzyl-1,4-diazabicyclo[2,2,2]octane. Such an impurity can, for example, be caused by organic structure directing agents still present in seed crystals used in the synthesis. Organotemplates contained in seed crystal material may not, however, participate in the crystallization process since they are trapped within the seed crystal framework and therefore may not act structure directing agents within the meaning of the present invention.

According to the present invention, a zeolitic material having a BEA framework structure is crystallized in step (2) of the synthetic method. For this purpose, $YO_2$ can be provided in step (1) in any conceivable form, provided that a zeolitic material having a BEA framework structure comprising $YO_2$ can be crystallized in step (2). Preferably, $YO_2$ is provided as such and/or as a compound which comprises $YO_2$ as a chemical moiety and/or as a compound which (partly or entirely) is chemically transformed to $YO_2$ during the inventive process. In one or more embodiments, wherein Y stands for Si or for a combination of Si with one or more further tetravalent elements, the source for $SiO_2$ provided in step (1) can be any conceivable source. There can therefore be used, for example, all types of silica and silicates, preferably fumed silica, silica hydrosols, reactive amorphous solid silicas, silica gel, silicic acid, water glass, sodium metasilicate hydrate, sesquisilicate or disilicate, colloidal silica, pyrogenic silica, silicic acid esters, or tetraalkoxysilanes, or mixtures of at least two of these compounds.

According to one or more embodiments of the synthetic method, wherein the mixture according to step (1) comprises one or more sources for $SiO_2$, said source preferably comprises one or more compounds selected from the group consisting of silica and silicates, preferably alkali metal silicates. Among the preferred alkali metal silicates, the one or more sources preferably comprise water glass, more preferably sodium and/or potassium silicate, and more preferably sodium silicate. In specific embodiments, the source for $SiO_2$ is sodium silicate. Furthermore, in further specific embodiments comprising silica, fumed silica is particularly preferred.

According to one or more embodiments, wherein the one or more zeolitic materials having a BEA framework structure comprise $X_2O_3$, one or more sources for $X_2O_3$ are provided in step (1) of the synthetic method. In general, $X_2O_3$ can be provided in any conceivable form, provided that a zeolitic material having a BEA framework structure comprising $X_2O_3$ can be crystallized in step (2). Preferably, $X_2O_3$ is provided as such and/or as a compound which comprises $X_2O_3$ as a chemical moiety and/or as a compound which (partly or entirely) is chemically transformed to $X_2O_3$ during the inventive process.

According to one or more embodiments of the synthetic method, wherein X stands for Al or for a combination of Al with one or more further trivalent elements, the source for $Al_2O_3$ provided in step (1) can be any conceivable source. There can be used for example any type of alumina and aluminates, aluminum salts such as, for example, alkali metal aluminates, aluminum alcoholates, such as, for example, aluminum triisopropylate, or hydrated alumina such as, for example, alumina trihydrate, or mixtures thereof. Preferably, the source for $Al_2O_3$ comprises one or more compounds selected from the group consisting of alumina and aluminates, preferably aluminates, more preferably alkali metal aluminates. Among the preferred alkali metal aluminates, the one or more sources preferably comprises sodium and/or potassium aluminate, more preferably sodium aluminate. In specific embodiments of the synthetic method, the source for $Al_2O_3$ is sodium aluminate.

In cases wherein the mixture of step (1) further comprises one or more sources for $X_2O_3$ including one or more boron compounds, for example free boric acid and/or borates and/or boric esters, such as, for example, triethyl borate or trimethyl borate, can be used as starting materials.

According to specific embodiments of the synthetic method, the mixture according to step (1) comprises one or more silicates as a source for $YO_2$ and one or more aluminates as a source for $X_2O_3$, more preferably one or more alkali metal silicates and/or one or more alkali metal aluminates, and even more preferably one or more water glass compounds and/or one or more alkali metal aluminates, wherein the alkali metal of said specific embodiments preferably comprises sodium and/or potassium, more preferably sodium, and wherein the alkali metal even more preferably is sodium.

According to further embodiments of the synthetic method, the mixture according to step (1) comprises silica and one or more silicates as a source for $YO_2$ and one or more aluminates as a source for $X_2O_3$, more preferably fumed silica and one or more alkali metal silicates and/or one or more alkali metal aluminates, and even more preferably silica and one or more water glass compounds and/or one or more alkali metal aluminates, wherein the alkali metal of said specific embodiments preferably comprises sodium and/or potassium, more preferably sodium, and wherein the alkali metal even more preferably is sodium.

In one or more embodiments of the synthetic method wherein the mixture according to step (1) comprises one or more sources for $X_2O_3$, the $YO_2:X_2O_3$ molar ratio of the mixture can have any conceivable value, provided that a zeolitic material having a BEA framework structure comprising both $YO_2$ and $X_2O_3$ is crystallized in step (2). Generally, the molar ratio ranges from 1 to 100, preferably from 5 to 75, more preferably from 10 to 50, more preferably from 15 to 40, more preferably from 18 to 35, and particularly preferably from 20 to 33.

In embodiments of the synthetic method, the zeolitic material obtained and/or obtainable and/or the inventive material as such according to the synthetic method comprises one or more alkali metals M, preferably sodium and/or potassium, and more preferably sodium. The alkali metal can be added at any conceivable stage of the synthetic method, wherein preferably it is also added in step (1). More preferably, the entire quantity of the alkali metal comprised in the zeolitic material having a BEA framework structure is added in step (1) of the synthetic method. In specific embodiments of the synthetic method, the alkali metal is partly or entirely contained in the one or more sources for $YO_2$ and/or $X_2O_3$ provided in step (1), wherein preferably, the alkali metal is entirely contained in the one or more sources for $YO_2$ and/or $X_2O_3$, and more preferably in both the one or more sources for $YO_2$ and/or $X_2O_3$.

In general, the alkali metal M can be contained in the mixture according to step (1) of the synthetic method in any conceivable amount, provided that a zeolitic material having a BEA framework structure is crystallized in step (2). Preferably, the $M:YO_2$ molar ratio in the mixture according to step (1) ranges from 0.1 to 2, more preferably from 0.2 to 1.2, more preferably from 0.3 to 1, more preferably from 0.4 to 0.85, more preferably from 0.5 to 0.75, and more preferably from 0.55 to 0.7. According to specific embodiments of the synthetic method, the $M:YO_2$ molar ratio in the mixture according to step (1) ranges from 0.61 to 0.65.

According to one or more embodiments of the synthetic method, the mixture according to step (1) comprises one or more sources for $X_2O_3$ and one or more alkali metals M. In general, any conceivable amounts of these components can be contained in the mixture provided that a zeolitic material having a BEA framework structure is crystallized in step (2). Preferably, the $YO_2:X_2O_3:M$ molar ratios in the mixture according to step (1) range from (1-100):1:(2-90), more preferably from (5-75):1:(4-60), more preferably from (10-50):1:(6-40), more preferably from (15-40):1:(8-30), more preferably from (18-35):1:(10-25), and even more preferably from (20-33):1:(12-22).

According to one or more embodiments of the synthetic method, seed crystals are provided in step (1), wherein said seed crystals comprise a zeolitic material having a BEA framework structure. In general, said seed crystals can comprise any zeolitic material having a BEA framework structure, provided that a zeolitic material having a BEA framework structure is crystallized in step (2). Preferably, the zeolitic material having a BEA framework structure comprised in the seed crystals is a zeolitic material which is obtainable and preferably obtained according to the synthetic method. More preferably, the zeolitic material having a BEA framework structure comprised in the seed crystals is the same as the zeolitic material having a BEA framework structure which is then crystallized in step (2). Particularly preferred are seed crystals comprising zeolite Beta, more preferably zeolite Beta which is obtainable or has preferably been obtained according to the synthetic method. In particularly one or more embodiments, the seed crystals are zeolite Beta crystals, preferably zeolite Beta crystals which are obtainable or have preferably been obtained according to the synthetic method.

According to the synthetic method, any suitable amount of seed crystals can be provided in the mixture according to step (1), provided that a zeolitic material having a BEA framework structure is crystallized in step (2). In general, the amount of seed crystals contained in the mixture according to step (1) ranges from 0.1 to 50 wt.-% based on 100 wt.-% of $YO_2$ in the one or more sources for $YO_2$, preferably from 0.5 to 35 wt.-%, more preferably from 1 to 20 wt.-%, more preferably from 1.5 to 10 wt.-%, more preferably from 2 to 5 wt.-%, and even more preferably from 2.5 to 3.5 wt.-%.

In step (1) according to the synthetic method, the mixture can be prepared by any conceivable means, wherein mixing by agitation is preferred, preferably by means of stirring.

In one or more embodiments of the synthetic method, the mixture according to step (1) further comprises a solvent. Any conceivable solvent can be used in any conceivable amount, provided that a zeolitic material having a BEA framework structure can be crystallized in step (2) of the synthetic method. Preferably, the solvent comprises water, wherein the $H_2O:YO_2$ molar ratio of the mixture ranges from 1 to 100, preferably from 5 to 70, more preferably from 10 to 50, more preferably from 12 to 35, more preferably from 15 to 25, more preferably from 16 to 20, and particularly preferably from 17 to 18. In particularly one or more embodiments, the solvent provided in step (1) is distilled water.

In general, the single components for providing the mixture of step (1) of the synthetic method can be added in any order, provided that a zeolitic material having a BEA framework structure is crystallized from the mixture in step (2) of the synthetic method. This may, for example, involve the addition of the optional solvent and the one or more sources for $X_2O_3$ followed by the addition of the one or more sources for $YO_2$, wherein the seed crystals are only added to the mixture afterwards. Alternatively, the addition of the optional solvent and the one or more sources for $X_2O_3$ may be first followed by the addition of the seed crystals, wherein the one or more sources for $YO_2$ is only added thereafter.

In general, step (2) according to the synthetic method can be conducted in any conceivable manner, provided that a zeolitic material having a BEA framework structure is crystallized from the mixture according to step (1). The mixture can be crystallized in any type of vessel, wherein a means of agitation is optionally employed, said agitation being preferably achieved by rotation of the vessel and/or stirring, and more preferably by stirring the mixture.

According to the synthetic method, the mixture is preferably heated during at least a portion of the crystallization process in step (2). In general, the mixture can be heated to any conceivable temperature of crystallization, provided that a zeolitic material having a BEA framework structure is crystallized from the mixture. Preferably, the mixture is heated to a temperature of crystallization ranging from 80 to 200° C., more preferably from 90 to 175° C., more preferably from 95 to 150° C., more preferably from 100 to 140° C., more preferably from 110 to 130° C., and even more preferably from 115 to 125° C.

The preferred heating in step (2) of the synthetic method can be conducted in any conceivable manner suitable for the crystallization of a zeolitic material having a BEA framework structure. In general, heating may be conducted at one temperature of crystallization or vary between different temperatures. Preferably, a heat ramp is used for reaching the temperature of crystallization, wherein, by way of example, the heating rate may range from 10 to 100° C./h, more preferably from 15 to 70° C./h, more preferably from 20 to 50° C./h, more preferably from 25 to 40° C./h, and even more preferably from 30 to 35° C./h.

In one or more embodiments of the synthetic method, the mixture according to step (1) is subjected in step (2) to a pressure which is elevated with regard to normal pressure. The term "normal pressure" as used in the context of the present invention relates to a pressure of 101,325 Pa in the ideal case. However, this pressure may vary within boundaries known to the person skilled in the art. By way of example, this pressure can be in the range of from 95,000 to 106,000 or of from 96,000 to 105,000 or of from 97,000 to 104,000 or of from 98,000 to 103,000 or of from 99,000 to 102,000 Pa.

In one or more embodiments of the synthetic method wherein a solvent is present in the mixture according to step (1), it is furthermore preferred that heating in step (2) is conducted under solvothermal conditions, meaning that the mixture is crystallized under autogenous pressure of the solvent which is used, for example by conducting heating in an autoclave or other crystallization vessel suited for generating solvothermal conditions. In specific embodiments wherein the solvent comprises or consists of water, preferably of distilled water, heating in step (2) is accordingly preferably conducted under hydrothermal conditions.

The apparatus which can be used in the synthetic method for crystallization is not particularly restricted, provided that the desired parameters for the crystallization process can be realized, in particular with respect to the one or more embodiments requiring particular crystallization conditions. In the one or more embodiments conducted under solvothermal conditions, any type of autoclave or digestion vessel can be used, wherein a Teflon-lined apparatus is preferred.

In general, the duration of the crystallization process in step (2) of the synthetic method is not particularly limited. In one or more embodiments involving heating of the mixture according to step (1), said crystallization process is conducted for a period ranging from 10 to 200 h, more preferably from 30 to 150 h, more preferably from 100 to 140 h, and even more preferably from 110 to 130 h.

According to one or more embodiments of the synthetic method, wherein the mixture is heated in step (2), said heating may be conducted during the entire crystallization process or during only one or more portions thereof, provided that a zeolitic material having the BEA framework structure is crystallized. Preferably, heating is conducted during the entire duration of crystallization.

In general, the process of the synthetic method can optionally comprise further steps for the work-up and/or further physical and/or chemical transformation of the zeolitic material having a BEA framework structure crystallized in step (2) from the mixture provided in step (1). The crystallized material can for example be subject to any sequence of isolation and/or washing procedures, wherein the zeolitic material obtained from crystallization in step (2) is preferably subject to one or more isolation and one or more washing procedures.

Isolation of the crystallized product can be achieved by any conceivable means. Preferably, isolation of the crystallized product can be achieved by means of filtration, ultrafiltration, diafiltration, centrifugation and/or decantation methods, wherein filtration methods can involve suction and/or pressure filtration steps.

With respect to one or more optional washing procedures, any conceivable solvent can be used. Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and one or more alcohols, such as water and methanol or water and ethanol or water and propanol or water and methanol and ethanol or water and methanol and propanol or water and ethanol and propanol or water and methanol and ethanol and propanol. Water or a mixture of water and one or more alcohols, preferably water and ethanol, is preferred, distilled water being very particularly preferred as the only washing agent.

Preferably, the separated zeolitic material is washed until the pH of the washing agent, preferably the washwater, is in the range of from 6 to 8, preferably from 6.5 to 7.5, as determined via a standard glass electrode.

Furthermore, the synthetic method can optionally comprise one or more drying steps. In general, any conceivable means of drying can be used. Drying procedures preferably include heating and/or applying vacuum to the zeolitic material having a BEA framework structure. In envisaged embodiments of the synthetic method, one or more drying steps may involve spray drying, preferably spray granulation of the zeolitic material.

In embodiments which comprise one or more drying steps, the drying temperatures are preferably in the range of from 25° C. to 150° C., more preferably of from 60 to 140° C., more preferably of from 70 to 130° C. and even more preferably in the range of from 75 to 125° C. The durations of drying are preferably in the range of from 2 to 60 h, more preferably in the range of 6 to 48 hours, and even more preferably of from 12 to 24 h.

According to the synthetic method, the zeolitic material crystallized in step (2) can optionally be subject to one or more ion-exchange procedures. In general, any conceivable ion-exchange procedure with all possible ionic elements and/or molecules can be conducted on the zeolitic material. Preferably, as ionic elements one or more cation and/or cationic elements are employed which preferably comprise one or more cations and/or cationic elements selected from the group consisting of $H^+$, $NH_4^+$, lithium, potassium, calcium, magnesium, barium, transition metals, and combinations thereof, more preferably from the group consisting of $H^+$, $NH_4^+$, lithium, potassium, calcium, magnesium, barium, lanthanum, cerium, nickel, platinum, palladium, and combinations thereof, wherein even more preferably the one or more cation and/or cationic elements comprise $H^+$ and/or $NH_4^+$, preferably $NH_4^+$.

In general, the optional washing and/or isolation and/or ion-exchange procedures comprised in the synthetic method can be conducted in any conceivably order and repeated as often as desired.

Therefore, according to further one or more embodiments, the synthetic method optionally comprises one or more of the following steps of
(3) isolating the zeolitic material having a BEA framework structure, preferably by filtration,
and/or
(4) washing the zeolitic material having a BEA framework structure,
and/or
(5) drying the zeolitic material having a BEA framework structure,
and/or
(6) subjecting the zeolitic material having a BEA framework structure to an ion-exchange procedure,
wherein the steps (3) and/or (4) and/or (5) and/or (6) can be conducted in any order, and
wherein one or more of said steps is preferably repeated at least once.

Preferably, the synthetic method comprises one or more steps of isolating the zeolitic material crystallized according to step (2), more preferably by filtration thereof. According to the synthetic method it is further preferred that after the one or more steps of isolating, the zeolitic material is subject to one or more steps of drying, wherein more preferably the zeolitic material is subject to one or more steps of washing prior to the one or more drying steps. In a particularly preferred embodiment, the zeolitic material crystallized according to step (2) is subject to one or more steps of isolating, followed by one or more steps of washing, followed by one or more steps of drying.

According to a further embodiment of the synthetic method, the zeolitic material crystallized in step (2) is directly subject to one or more steps of drying, preferably to spray drying and or spray granulation, without isolating, washing, or drying of the zeolitic material beforehand. Directly subjecting the mixture obtained from step (2) of the synthetic method to a spray drying or spray granulation stage has the advantage that isolation and drying is performed in a single stage.

According to a further embodiment of the synthetic method, the zeolitic material obtained from crystallization in step (2) is subject to one or more isolating steps prior to being subject to one or more ion-exchange procedures, preferably to one or more isolating steps followed by one or more washing steps, and more preferably to one or more isolating steps followed by one or more washing steps followed by one or more drying steps.

The synthetic method preferably does not comprise a calcination step generally involving the heating of the zeolitic material crystallized according to step (2) above a temperature of 500° C. More preferably, the synthetic method for the production of a zeolitic material having a BEA framework structure which does not comprise a calcination step refers to synthetic methods, wherein the zeolitic material crystallized according to step (2) is not subject to a temperature exceeding 450° C., more preferably 350° C., more preferably 300° C., more preferably 250° C., more preferably 200° C., more preferably 150° C., and even more preferably 100° C.

Thus, according to the present invention, the one or more zeolitic materials provided in step (i) of the inventive process are preferably obtainable, and even more preferably obtained according to one or more of the aforementioned preferred and particularly synthetic methods.

According to the present invention, the one or more zeolitic materials provided in step (i) preferably do not contain more than an impurity of an organic structure directing agent typically used in the synthesis of zeolitic materials having a BEA framework structure, in particular specific tetraacylammonium salts and/or related organotemplates such as tetraethylammonium and/or dibenzylmethylammonium salts, and dibenzyl-1,4-diazabicyclo[2,2,2]octane. Such an impurity can, for example, be caused by organic structure directing agents still present in seed crystals used in the synthetic process.

Furthermore, in one or more embodiments, the one or more zeolitic materials, are non-calcined, meaning that they have not been subject to a calcination step. Within the meaning of the present invention, a calcination step generally designates a process involving the heating of the one or more zeolitic materials above a temperature of 500° C. More preferably, however, a non-calcined zeolitic material according to the present invention designates a material not having been subject to a temperature exceeding 450° C., more preferably 350° C., more preferably 300° C., more preferably 250° C., more preferably 200° C., and even more preferably not exceeding 150° C. In general, a calcination step may designate any step which may be employed in the synthesis of the one or more zeolitic materials used in the inventive process. According to the present invention, however, a calcination step preferably only refers to a step conducted after completion of the crystallization of the one or more zeolitic materials having a BEA framework structure from one or more precursor compounds which do not have a BEA framework structure, with the exception of any seeding crystals which may be employed therein. According to a yet further preferred embodiment of the present invention, a calcination step only refers to a step which is normally or suitably performed after completed crystallization of the one or more zeolitic materials for the removal of organotemplates from the framework structure.

Thus, according to one or more embodiments of the present invention, the one or more zeolitic materials provided in step (i) are non-calcined.

According to the present invention, there is no particular restriction as to the crystalline structure of the one or more zeolitic materials provided in step (i) of the inventive process, provided that these display a BEA framework structure, and, in particular, that the one or more zeolitic materials afford an X-ray diffraction pattern comprising the reflections typical of a BEA framework structure. Within the meaning of the present invention, an X-ray pattern typical of a BEA framework structure primarily designates a pattern of reflections comprised in an X-ray diffractogramm, wherein the 2θ diffraction angles are typical of a BEA framework structure, and wherein also the relative intensities of the individual reflections are typical of a BEA framework structure.

According to the present invention, there is no particular restriction as to the surface area of the one or more zeolitic materials provided in step (i) of the inventive process provided that the one or more zeolitic materials are suitable for catalyzing the acylation of an organic compound. Thus, with respect to the BET surface area of the one or more zeolitic materials determined according to DIN 66135, by way of example these may from 200 to 700 $m^2/g$, wherein preferably the BET surface area is comprised in the range of from 400 to 650 $m^2/g$, more preferably of from 475 to 575 $m^2/g$, and even more preferably of from 500 to 550 $m^2/g$. According to particularly one or more embodiments, the BET surface area determined according to DIN 66135 ranges from 510 to 530 $m^2/g$.

In a specific embodiment, prior to step (ii) at least a portion of the one or more alkali metals M preferably comprised in the one or more zeolitic materials provided in step (i) is exchanged with $H^+$ and/or $NH_4^+$. According to particularly one or more embodiments, at least a portion of the one or more alkali metals M are exchanged with $NH_4^+$.

Thus, according to particularly one or more embodiments, prior to the procedure in step (ii) at least a portion of the alkali metal atoms M contained in the one or more zeolitic materials provided in step (i) is exchanged with $H^+$ and/or $NH_4^+$, preferably with $NH_4^+$.

With respect to the exchange of the one or more alkali metals M in the one or more zeolitic materials provided in step (i), there is no particular restriction as to the method according to which the substitution or exchange is achieved, provided that the zeolitic materials which are obtained prior to step (ii) are suited for the subsequent procedure for removing at least a portion of X in step (ii) of the inventive process. According to particularly one or more embodiments, the substitution or exchange is achieved by ion-exchange. According to the present invention, the term "ion-exchange" generally refers to non-framework ionic elements and/or molecules contained in the one or more zeolitic materials.

As regards the ion-exchange procedure conducted prior to step (ii) for substituting at least a portion of the alkali metal atoms M, said procedure may in principle be conducted in any suitable fashion using any suitable conditions for achieving the aforementioned substitution of alkali metal atoms M. According to particularly one or more embodiments, the procedure is conducted in a suitable solvent and preferably in aqueous solution. Furthermore, in embodiments employing a solvent which is preferably water, it is further preferred to conduct the ion-exchange procedure at a neutral or acidic pH, and preferably at an acidic pH. Thus, by way of example, the pH employed in said one or more embodiments may range anywhere from 0 to 7, wherein more preferably the pH is comprised in the range of from 1 to 6, more preferably of from 1 to 4, more preferably of from 1.5 to 3.5, and even more preferably of from 2 to 3.5. According to particularly one or more embodiments, the pH is comprised in the range of from 2.5 to 3.5.

Thus, according to particularly one or more embodiments, the ion-exchange process conducted prior to step (ii) is performed at a pH in the range of from 0 to 7, preferably of from 1 to 6, more preferably of from 1 to 4, more preferably of from 1.5 to 3.5, more preferably of from 2 to 3.5, and even more preferably of from 2.5 to 3.5.

According to the present invention, the procedure conducted in step (ii) of the inventive process leads to the removal of at least a portion of the trivalent element X from the BEA framework structure of the one or more zeolitic materials. In this respect, there is no particular restriction as to the process and conditions which may be used in step (ii) provided that at least a portion of the element X originally present in the BEA framework as a constituting element thereof is removed. Within the meaning of the present invention, the term "removing" with respect to the removal of at least a portion of the framework element X indicates that said procedure leads to the alteration of the framework such that said portion of X which has been removed is not present in the one or more zeolitic materials provided in step (i) and/or is not contained therein as a framework element. Within the meaning of the present invention, the term "framework element" or "framework ion" defines a constituting element or ion of the BEA framework structure, and in particular with respect to its coordination in the framework structure. In this respect, a framework element X preferably refers to X which is comprised in the framework structure in a tetrahedral coordination.

The term "non-framework element" or "non-framework" ion, on the other hand, refers to any element or ion contained in the zeolitic material having a BEA framework structure which is not a constituting the framework structure, meaning that it is for example contained in the micropores of the structure and/or that it only serves to compensate the structural framework, for example as counter ion or the like. Furthermore, said terms also refer to originally constituting elements or ions of the BEA framework structure which have been altered from their original coordination state. In particular, a non-framework element X refers to X originally contained in the framework structure as a constituting element, and in particular as tetrahedrally coordinated X in the BEA framework, and which has been subsequently removed from the framework structure for example by a change in its original coordination state and/or by being contained in the micropores of the zeolitic material as opposed to the framework thereof. Thus, according to a preferred definition of the present invention, a non-framework element or ion X refers to X which was originally tetrahedrally coordinated in the BEA framework structure, and which subsequently displays a different coordination state and preferably a higher coordination state. In particular, it is particularly preferred according to the present invention that a non-framework element X refers to originally tetrahedrally coordinated X which after having been subject to step (ii) is contained in the zeolitic material in a pentahedral and/or octahedral coordination, and preferably in an octahedral coordination state.

According to one or more embodiments of the inventive process, at least a portion of X is removed from the BEA framework structure by steam treatment of the one or more zeolitic materials provided in step (i). In this respect, there are no particular limitations according to the present invention as to the procedure and conditions which may be employed in said procedure used in step (ii), provided that at least a portion of X is removed from the BEA framework structure.

Thus, according to one or more embodiments of the present invention, the procedure in step (ii) for removing at least a portion of X from the BEA framework structure comprises one or more steam-treatment steps (S).

In principle, any conceivable temperature may be employed in the steam-treatment step (S), provided that at least a portion of X is removed from the BEA framework structure. Thus, by way of example, the one or more steam-treatment steps may be conducted at any temperature comprised in the range of from 200 to 1,000° C., wherein preferably the steam temperature is comprised in the range of from 300 to 900° C., more preferably of from 400 to 800° C., and even more preferably of from 500 to 700° C. According to particularly one or more embodiments, the one or more of the one or more steam-treatment steps (S) is conducted at a temperature comprised in the range of from 550 to 650° C.

Furthermore, according to the present invention, there is no particular restriction as to the duration of the one or more steam-treatment steps (S) preferably employed in step (ii) of the inventive process, provided that at least a portion of X is removed from the BEA framework structure. In this respect, a duration of the steam treatment step ranging anywhere from 0.1 to 48 h may be mentioned by way of example, wherein preferably the duration is comprised in a range of anywhere from 0.2 to 24 h, more preferably of from 0.3 to 12 h, more preferably from 0.35 to 6 h, more preferably of from 0.4 to 4 h, and even more preferably of from 0.45 to 2 h. In a specific embodiment, the steam treatment step (S) is conducted for a period ranging from 0.5 to 1.5 h.

According to the one or more embodiments of the present invention wherein step (ii) of the inventive process includes one or more steam-treatment step (S), either pure steam may be used or one or more further gases may be additionally present in the steam. In embodiments wherein the steam includes further gases, there is in principle no particular restriction neither to the type nor to the amount of the one or more further gases which may be used, provided that at least a portion of X may be removed from the BEA framework structure using said steam containing gas. In a specific embodiment, one or more additional gases to steam be used which do not chemically react with the one or more zeolitic materials. Thus, according to particularly one or more embodiments, one or more inert gases and preferably nitrogen is used as a further gas in addition to steam in the one or more steam-treatment steps (S).

In one or more embodiments of the present invention wherein the steam used in the steam-treatment step (S) comprises one or more further gases, preferably one or more further inert gases and more preferably nitrogen, the content of steam in the resulting gas mixture may, by way of example, range anywhere from 5 to 75 vol.-%, wherein preferably the steam content is comprised in the range of from 10 to 50 vol.-%, and even more preferably of from 15 to 25 vol.-%.

Thus, according to specific embodiments of the present invention, the one or more steam-treatment steps (S) employed in step (ii) are conducted using a steam concentration of from 5 to 75 vol.-%, preferably of from 10 to 50 vol.-%, and more preferably of from 15 to 25 vol.-%, wherein the remaining volume is preferably an inert gas, more preferably nitrogen.

In a specific embodiment of the inventive process, one or more steam-treatment steps (S) employed in step (ii) are followed by one or more acid-treatment steps (A). As concerns the types of acids, the procedure, and the conditions which may be employed in said specific embodiments of the inventive process, no particular limitation applies provided that said one or more acid-treatment steps do not interfere with the removal of at least a portion of X from the BEA framework structure in step (ii). Furthermore the procedure is chosen such that the BEA framework structure of the treated zeolitic material is retained as least in part, wherein it is preferred that the BEA framework structure is not deteriorated or partly destroyed during the acid-treatment step compared the its condition prior thereto.

Therefore, according to specific embodiments of the present invention it is further preferred that the procedure in step (ii) further comprises subjecting the one or more zeolitic materials obtained from the one or more steam-treatment steps (S) to one or more acid-treatment steps (A).

Regarding the particularly preferred additional acid-treatment step (A), the procedure may be conducted under any suitable conditions leading to the contacting of the steam-treated zeolitic material with one or more acids or acidic compounds, wherein the procedure is preferably conducted in a suitable solvent and preferably in aqueous solution. As concerns the preferred procedures conducted with the aid of a solvent and in particular in aqueous solution, there is no particular restriction as to the pH of the solution, provided that it is acidic. Thus, by way of example, the one or more particularly preferred acid-treatment steps may be conducted at a pH of 4 or less, wherein a pH of 3.5 or less is preferred. According to particularly one or more embodiments, the pH is comprised in the range of from −1.5 to 3, more preferably of from −1 to 2.5, more preferably of from −0.5 to 2, and even more preferably of from −0.5 to 1, wherein it is yet further preferred according to said embodiments that the pH is comprised in the range of from −0.5 to 0.5.

Thus, it is further preferred according to said particularly preferred embodiment of the inventive process that the one or more acid-treatment steps (A) involve contacting the one or more zeolitic materials with an acidic solution having a pH of 4 or less, preferably of 3.5 or less, wherein preferably the pH is in the range of from −1.5 to 3, more preferably of from −1 to 2.5, more preferably of from −0.5 to 2, more preferably of from −0.5 to 1, and even more preferably of from −0.5 to 0.5.

As concerns the conditions used for the particularly preferred additional acid-treatment step (A), there is again no particular limitation in this respect. Accordingly, the procedure may be conducted at ambient temperature or, preferably, under heating. Regarding specific embodiments wherein the acid-treatment step (A) is conducted at temperatures which are elevated with respect to ambient conditions, it is further preferred that the acid-treatment is conducted at a temperature comprised in the range of from 50 to 100° C., wherein more preferably the temperature employed for the acid-treatment step is comprised in the range of from 60 to 95° C., more preferably of from 70 to 90° C., and even more preferably of from 75 to 85° C.

Furthermore, there is also no particular limitation according to the particularly preferred acid-treatment step (A) as concerns the duration thereof, provided that the BEA framework structure of the treated zeolitic material is retained as least in part, and that the BEA framework structure is preferably not deteriorated or partly destroyed due to the particular duration of the acid-treatment step compared the zeolitic material's condition prior thereto. According to the present invention it is however preferred that the duration of the acid-treatment step (A) is comprised in the range of from 0.25 to 5 h, and more preferably of from 0.5 to 4.5 h, more preferably of from 1 to 4 h, more preferably of from 1 to 3.5 h, wherein even more preferably the duration of the acid-treatment step (A) is comprised in the range of from 1.5 to 3.5 h.

Therefore, according to the specific embodiments of the inventive process involving one or more additional acid-treatment steps (A), said one or more acid-treatment steps (A) involve contacting the one or more zeolitic materials with an acidic solution at a temperature of from 50 to 100° C., preferably of from 60 to 95° C., more preferably of from 70 to 90° C., and even more preferably of from 75 to 85° C. Furthermore, according to said specific embodiments it is further preferred that the one or more acid-treatment steps (A) involve contacting the one or more zeolitic materials with an acidic solution for a period of from 0.25 to 5 h, preferably of from 0.5 to 4.5 h, more preferably of from 1 to 4 h, more preferably of from 1 to 3.5 h, and even more preferably of from 1.5 to 3.5 h.

According to alternatively one or more embodiments of the inventive process, the procedure in step (ii) for removing at least a portion of X from the BEA framework structure comprises one or more calcination steps (C).

As for the aforementioned steam-treatment and particularly preferred additional acid-treatment procedures, there is also no particular limitation with respect to the procedure and conditions which may be employed in the alternatively preferred calcination step for the removal of X from the BEA framework structure, provided that that the BEA framework structure of the calcinated zeolitic material is retained as least in part, wherein it is preferred that the BEA framework structure is not deteriorated or partly destroyed during the preferred calcination step compared the its condition prior thereto. Thus, as regards the temperature which may be employed for the calcination procedure, temperatures comprised in the range of from 450 to 800° C. may be mentioned by way of example, wherein preferably the calcination temperature is comprised in the range of from 550 to 750° C., and more preferably of from 600 to 720° C. According to particularly one or more embodiments, calcination temperatures are employed which are comprised in the range of from 620 to 700° C. Furthermore, concerning the duration of calcination, there is again no particular limitation in this respect, wherein it is preferred that the duration be comprised in the range of from 0.5 to 10 h, more preferably of from 1 to 6 h, and even more preferably of from 1.5 to 3 h.

Thus, according to alternatively one or more embodiments of the present invention, the one or more calcination steps (C) are conducted at a temperature of from 450 to 800° C., preferably of from 550 to 750° C., more preferably of from 600 to 720° C., and even more preferably of from 620 to 700° C. Furthermore and preferably in addition thereto, the one or more calcination steps (C) are conducted for a period ranging from 0.5 to 10 h, preferably of from 1 to 6 h, and even more preferably of from 1.5 to 3 h.

According to the inventive process, the step (ii) of subjecting the one or more zeolitic materials provided in step (i) to a procedure for removing at least a portion of X may be repeated. In this respect, there is no particular limitation as to the number of repetitions, provided that the zeolitic material is retained as least in part, and preferably that the BEA framework structure is not deteriorated or partly destroyed as a result of excessive repetition of step (ii). Thus, by way of example, step (ii) of the inventive process my be repeated anywhere from once to 5 times, wherein preferably step (ii) is repeated 1 to 5 times, more preferably 1 to 3 times, and even more preferably once or twice. According to specific embodiments of the inventive process, step (ii) is repeated twice.

Furthermore, according to the specific embodiments involving the repetition of step (ii) it is yet further preferred that said repetition comprises the repetition of one or more of the one or more calcination steps (C). In this respect, there is no particular preference as to the specific type of the one or more calcination steps (C) according to the one or more embodiments of the inventive process as outlined above which may be repeated, wherein it is particularly preferred that in those embodiments involving the repetition of the one or more calcination steps in step (ii), the calcination steps according to the specific embodiments of the present invention as outlined in the foregoing are repeated therein.

Therefore, according to one or more embodiments of the inventive process, step (ii) is repeated one or more times, preferably 1 to 5 times, more preferably 1 to 3 times, more preferably 1 or 2 times, and even more preferably 2 times, wherein it is particularly preferred that the repetition of step (ii) comprises the repetition of one or more of the one or more calcination steps (C) according to one or more embodiments and in particular according to specific embodiments as outlined in the foregoing.

Furthermore, according to the specific embodiments involving the repetition of step (ii) involving one or more calcination steps (C), it is particularly preferred according to said embodiments that prior to at least one of said repetitions, and preferably prior to each of said repetitions, the one or more zeolitic materials are subject at least one ion-exchange procedure. In particular, it is especially preferred according to said embodiments that at least part of the non-framework element X which has been removed from the BEA framework in step (ii) is first removed from the zeolitic material prior to a repetition of the one or more calcination steps (C) in a further step (ii). According to said particularly one or more embodiments, there is no particular restriction as to the specific type of ion-exchange procedure which is employed prior to the repetition of step (ii), provided that at least a portion and preferably all of the non-framework X which has been removed from the BEA framework structure in the initial and/or preceding step (ii) may be exchanged with one or more cations and/or cationic elements, wherein the non-framework X preferably comprises octahedrally coordinated non-framework X. According to said specific embodiments it is further preferred that the non-framework X comprised in the one or more zeolitic materials obtained from an initial and/or preceding step (ii) is exchanged with $H^+$ and/or $NH_4^+$, and more preferably with $NH_4^+$ prior to the repetition of step (ii), and in particular to the one or more calcination steps (C).

Thus, according to specific embodiments of the inventive process, at least part of the non-framework ions respectively present in the one or more zeolitic materials are exchanged with one or more cations and/or cationic elements prior to repeating step (ii), wherein the one or more cation and/or cationic elements preferably comprise $H^+$ and/or $NH_4^+$, wherein even more preferably at least part of the non-framework ions are exchange with $NH_4^+$. In particular, according to yet one or more embodiments of said particularly one or more embodiments, the non-framework ions comprise X, preferably X which has been removed from the BEA framework structure in a previous step (ii).

The present invention further relates to a zeolitic material having a BEA framework structure which is either obtained by the process according to the present invention or by any conceivable process which leads to a zeolitic material having a BEA framework structure as obtainable according to the inventive process.

Therefore, the present invention also relates to a zeolitic material having a BEA framework structure obtainable and/or obtained according to the inventive process.

The present invention, however, also relates to a zeolitic material having a BEA framework structure per se, wherein the BEA framework structure comprises $YO_2$ and $X_2O_3$, wherein Y is a tetravalent element, and X is a trivalent element, and wherein the $^1H$ MAS NMR of the zeolitic material comprises a first peak (P1) in the range of from 0.40 to 1.00 ppm, a second peak (P2) in the range of from 1.40 to 2.00 ppm, and a third peak (P3) in the range of from 2.30 to 2.90 ppm, wherein the integration of the first, second, and third peaks in the $^1H$ MAS NMR of the zeolitic material offers a ratio of the integration values P1:P2:P3 of 1:(0.5-1.2):(0.30-2.5). In particular, the zeolitic material according to the present invention is characterized in that it has a $^1H$ MAS NMR displaying signals attributed to extra-framework X hydroxyls (P1), single Y—OH hydroxyl moieties (P2), and X—OH due to hydrogen-bond effects (P3).

According to one or more embodiments of the present invention, in the $^1H$ MAS NMR of the zeolitic material the first peak (P1) is comprised in the range of from 0.50 to 0.90 ppm, preferably of from 0.60 to 0.80 ppm, and even more preferably of from 0.65 to 0.75 ppm. According to or alternatively to said one or more embodiments, the second peak (P2) in the $^1H$ MAS NMR of the zeolitic material is preferably comprised in the range of from 1.50 to 1.90 ppm, more preferably of from 1.60 to 1.80 ppm, and even more preferably of from 1.65 to 1.75 ppm. Furthermore, according to or alternatively to said respectively one or more embodiments, the third peak (P3) in the $^1H$ MAS NMR of the zeolitic material is preferably comprised in the range of from 2.40 to 2.80 ppm, more preferably of from 2.50 to 2.70 ppm, and even more preferably of from 2.55 to 2.65 ppm.

In addition to or alternatively to said respectively one or more embodiments with respect to the ppm ranges for the first and/or second and/or third peaks P1, P2, and P3, the integration of said first, second, and third peaks in the $^1H$ MAS NMR of the zeolitic material preferably offers a ratio of the integration values P1:P2:P3 of 1:(0.6-1.1):(0.50-1.5), more preferably of 1:(0.65-1):(0.60-1.2), more preferably of 1:(0.7-0.95):(0.70-1), more preferably of 1:(0.75-0.9):(0.75-0.9), and even more preferably of 1:(0.8-0.85):(0.8-0.85).

According to said preferred and specific embodiments of the inventive zeolitic material per se, wherein the BEA framework structure comprises $YO_2$ and $X_2O_3$ and has a particular $^1H$ MAS NMR, it is further preferred that said zeolitic material is obtainable according to any one of the aforementioned embodiments and one or more embodiments of the inventive process. Furthermore, according to a particularly preferred embodiment of the present invention, the inventive zeolitic material is obtained according to any one of the aforementioned embodiments and one or more embodiments of the inventive process.

Thus, the present invention also relates to a zeolitic materials having a BEA framework structure, optionally obtainable and/or obtained according to any of claims 1 to 28, wherein the BEA framework structure comprises $YO_2$ and $X_2O_3$, wherein Y is a tetravalent element, and X is a trivalent element, and wherein the $^1H$ MAS NMR of the zeolitic material comprises:

a first peak (P1) in the range of from 0.40 to 1.00 ppm, preferably of from 0.50 to 0.90 ppm, more preferably of from 0.60 to 0.80 ppm, and even more preferably of from 0.65 to 0.75 ppm;

a second peak (P2) in the range of from 1.40 to 2.00 ppm, preferably of from 1.50 to 1.90 ppm, more preferably of from 1.60 to 1.80 ppm, and even more preferably of from 1.65 to 1.75 ppm; and a third peak (P3) in the range of from 2.30 to 2.90 ppm, preferably of from 2.40 to 2.80 ppm, more preferably of from 2.50 to 2.70 ppm, and even more preferably of from 2.55 to 2.65 ppm;

wherein the integration of the first, second, and third peaks in the $^1H$ MAS NMR of the zeolitic material offers a ratio of the integration values P1:P2:P3 of 1:(0.5-1.2):(0.30-2.5), preferably of 1:(0.6-1.1):(0.50-1.5), more preferably of 1:(0.65-1):(0.60-1.2), more preferably of 1:(0.7-0.95):(0.70-1), more preferably of 1:(0.75-0.9):(0.75-0.9), and even more preferably of 1:(0.8-0.85):(0.8-0.85).

According to further one or more embodiments of the inventive zeolitic material, the $^1H$ MAS NMR thereof does not include a peak in the range of from 3.85 to 3.95 ppm having an integration value of 100% or more of the integration value of the first, second, and/or third peaks P1, P2, and P3. In particular, in the $^1H$ MAS NMR of a preferred embodiment of the inventive zeolitic material, a further peak is comprised in the range of from 3.60 to 4.20 ppm, preferably of from 3.70 to 4.10 ppm, more preferably of from 3.80 to 4.00 ppm, and even more preferably of from 3.85 to 3.95 ppm, which is attributed to Brønsted acidic sites. The zeolitic materials are however distinguished by a relatively small amount of Brønsted acidic sites, in particular compared to the amount of extra-framework X hydroxyls, single Y—OH hydroxyl moieties, and X—OH due to hydrogen-bond effects which are indicated by the respective intensities of the peaks P1, P2, and P3 in the $^1H$ MAS NMR of the inventive zeolitic material. According to said one or more embodiments, it is further preferred that the $^1H$ MAS NMR of the zeolitic material does not include a peak in the range of from 3.80 to 4.00 ppm, preferably of from 3.70 to 4.10 ppm, and even more preferably of from 3.60 to 4.20 ppm, having an integration value of 100% or more of the integration value of the first, second, and/or third peaks. Furthermore or alternatively to said further one or more embodiments, it preferred that in the $^1$H MAS NMR of the inventive zeolitic material said further peak does not have an integration value of 50% or more of the first, second, and/or third peaks, more preferably of 20% or more, more preferably of 10% or more, more preferably of 5% or more, more preferably of 1% or more, more preferably of 0.1% or more, and even more preferably of 0.01% or more of the integration value of the first, second, and/or third peaks.

Therefore, according to a preferred embodiment of the inventive zeolitic material the $^1$H MAS NMR of the zeolitic material does not include a peak in the range of from 3.85 to 3.95 ppm, preferably of from 3.80 to 4.00 ppm, more preferably of from 3.70 to 4.10 ppm, and even more preferably of from 3.60 to 4.20 ppm, having an integration value of 100% or more of the integration value of the first (P1), second (P2), and/or third (P3) peaks, preferably of 50% or more, more preferably of 20% or more, more preferably of 10% or more, more preferably of 5% or more, more preferably of 1% or more, more preferably of 0.1% or more, and even more preferably of 0.01% or more of the integration value of the first, second, and/or third peaks.

According to the present invention, in the zeolitic material having a BEA framework structure, Y stands for any conceivable tetravalent element, Y standing for either one or several tetravalent elements. Preferred tetravalent elements according to the present invention include Si, Sn, Ti, Zr, and Ge, and combinations thereof. More preferably, Y stands for Si, Ti, or Zr, or any combination of said trivalent elements, even more preferably for Si and/or Sn. According to the present invention, it is particularly preferred that Y stands for Si.

Furthermore, in the zeolitic material having a BEA framework structure of the present invention, X stands for any conceivable trivalent element, X standing for either one or several trivalent elements. Preferred trivalent elements according to the present invention include Al, B, In, and Ga, and combinations thereof. More preferably, Y stands for Al, B, or In, or any combination of said trivalent elements, even more preferably for Al and/or B. According to the present invention, it is particularly preferred that X stands for Al.

Thus, according to one or more embodiments of the inventive zeolitic material, Y is selected from the group consisting of Si, Sn, Ti, Zr, Ge, and combinations of two or more thereof, Y preferably being Si. Furthermore or alternatively thereto, and preferably in addition thereto, according to further one or more embodiments X is selected from the group consisting of Al, B, In, Ga, and combinations of two or more thereof, X preferably being Al.

According to the present invention, there is no particular restriction as concerns the Y:X molar ratio of the inventive zeolitic material. Thus, by way of example the Y:X molar ratio of the inventive zeolitic material may be comprised in the range of from 2 to 60, wherein preferably the molar ratio is comprised in the range of from 3 to 40, more preferably of from 4 to 20, more preferably of from 5 to 15, and even more preferably of from 6 to 10. According to specific embodiments of the inventive zeolitic material, the Y:X molar ratio is comprised in the range of from 6.5 to 7.5.

Therefore, according to one or more embodiments, the Y:X molar ratio of the inventive zeolitic material is comprised in the range of from 2 to 60, preferably of from 3 to 40, more preferably of from 4 to 20, more preferably of from 5 to 15, more preferably of from 6 to 10, and even more preferably of from 6.5 to 7.5.

Furthermore, according to the present invention, there is no restriction as to the specific type or to the specific structure of the inventive zeolitic material, provided that the framework structure is of the BEA type and that it comprises $YO_2$ and $X_2O_3$, wherein Y is a tetravalent element, and X is a trivalent element. Thus, by way of example, the zeolitic material may comprise one or more zeolites having the BEA framework structure selected from the group consisting of zeolite Beta, [B—Si—O]-BEA, [Ga—Si—O]-BEA, [Ti—Si—O]-BEA, Al-rich beta, CIT-6, tschernichite, and pure silica beta, wherein preferably the zeolitic material comprises zeolite Beta.

Thus, according to specific embodiments of the present invention, the zeolitic material comprises zeolite Beta.

According to the present invention, there is no particular restriction as to the crystalline structure of the inventive zeolitic material, provided that it displays a BEA framework structure, and, in particular, it affords an X-ray diffraction pattern comprising the reflections typical of a BEA framework structure. As mentioned in the foregoing with respect to the inventive process, within the meaning of the present invention, an X-ray pattern typical of a BEA framework structure primarily designates a pattern of reflections comprised in an X-ray diffractogramm, wherein the 2θ diffraction angles are typical of a BEA framework structure, and wherein preferably also the relative intensities of the individual reflections are typical of a BEA framework structure. According to one or more embodiments of the present invention, the inventive zeolitic material having a BEA framework structure displays an X-ray diffraction pattern comprising at least the following reflections:

| Intensity (%) | Diffraction angle 2θ/° [Cu K(alpha 1)] |
| --- | --- |
| [8-28] | [21.24-21.44] |
| 100 | [22.28-22.48] |
| [5-25] | [25.18-25.38] |
| [5-25] | [26.88-27.08] |
| [4-24] | [28.62-28.82] |
| [8-28] | [29.42-29.62] |
| [1-21] | [33.09-33.49] |
| [3-23] | [43.28-43.68] | wherein 100% relates to the intensity of the maximum peak in the X-ray powder diffraction pattern.

More preferably, the inventive zeolitic material having a BEA framework structure displays an X-ray diffraction pattern comprising at least the following reflections:

| Intensity (%) | Diffraction angle 2θ/° [Cu K(alpha 1)] |
| --- | --- |
| [8-28] | [21.29-21.39] |
| 100 | [22.33-22.43] |
| [5-25] | [25.23-25.33] |
| [5-25] | [26.93-27.03] |
| [4-24] | [28.67-28.77] |
| [8-28] | [29.47-29.57] |
| [1-21] | [33.19-33.39] |
| [3-23] | [43.38-43.58] | wherein 100% relates to the intensity of the maximum peak in the X-ray powder diffraction pattern.

According to specific embodiments which are further preferred, the inventive zeolitic material having a BEA framework structure displays an X-ray diffraction pattern comprising at least the following reflections:

| Intensity (%) | Diffraction angle 2θ/° [Cu K(alpha 1)] |
|---|---|
| [8-28] | [21.24-21.44] |
| 100 | [22.28-22.48] |
| [5-25] | [25.18-25.38] |
| [1-17] | [25.77-25.97] |
| [5-25] | [26.88-27.08] |
| [4-24] | [28.62-28.82] |
| [8-28] | [29.42-29.62] |
| [1-21] | [33.09-33.49] |
| [3-23] | [43.28-43.68] | wherein more preferably the X-ray diffraction pattern comprises at least the following reflections:

| Intensity (%) | Diffraction angle 2θ/° [Cu K(alpha 1)] |
|---|---|
| [8-28] | [21.29-21.39] |
| 100 | [22.33-22.43] |
| [5-25] | [25.23-25.33] |
| [1-17] | [25.82-25.92] |
| [5-25] | [26.93-27.03] |
| [4-24] | [28.67-28.77] |
| [8-28] | [29.47-29.57] |
| [1-21] | [33.19-33.39] |
| [3-23] | [43.38-43.58] | wherein 100% relates to the intensity of the maximum peak in the X-ray powder diffraction pattern.

Thus, according to one or more embodiments of the present invention, the inventive zeolitic material having a BEA framework structure has an X-ray diffraction pattern comprising at least the following reflections:

| Intensity (%) | Diffraction angle 2θ/° [Cu K(alpha 1)] |
|---|---|
| [8-28] | [21.24-21.44] |
| 100 | [22.28-22.48] |
| [5-25] | [25.18-25.38] |
| [5-25] | [26.88-27.08] |
| [4-24] | [28.62-28.82] |
| [8-28] | [29.42-29.62] |
| [1-21] | [33.09-33.49] |
| [3-23] | [43.28-43.68] | wherein 100% relates to the intensity of the maximum peak in the X-ray powder diffraction pattern, wherein even more preferably the X-ray diffraction pattern further comprises the following reflection:

| Intensity (%) | Diffraction angle 2θ/° [Cu K(alpha 1)] |
|---|---|
| [1-17] | [25.77-25.97] |

The present invention further concerns a process for the acylation of an organic compound using the inventive catalyst. In particular, it has surprisingly been found that a zeolitic material according to the present invention which is preferably obtainable and even more preferably obtained according to the inventive process affords an improved acylation catalyst which brought into contact with both an acylatable compound and an acylating agent. Most notably, when used as a catalyst in a process for the acylation of an organic compound, the inventive zeolitic material not only shows an increased activity, but also proves to be highly selective with respect to specific acylated products.

Thus, the present invention also relates to a process for the acylation of an organic compound comprising:
(a) providing a catalyst comprising one or more zeolitic materials having a BEA framework structure,
(b) contacting the catalyst with one or more acylatable organic compounds in the presence of one or more acylating agents in one or more reactors for obtaining one or more acylated organic compounds,
wherein the one or more zeolitic materials is a zeolitic material having a BEA framework structure according to any of claims 29 to 36

As regards the one or more acylatable organic compounds with which the catalyst is contacted in step (b) of the inventive process, there is no particular restriction as to the type of organic compounds which may be used as the one or more acylatable compounds, provided that it may be acylated with the one or more acylating agents employed in said step. In this respect, it is noted that within the meaning of the present invention, the one or more acylated organic compounds obtained in step (b) comprise one or more acylated organic compounds which are the acylation product of the reaction of one or more acylatable organic compounds with one or more acylating agents. Thus, in principle, the acylatable organic compound may be any organic compound capable of reacting with at least one of the one or more acylating agents used in step (b), wherein during the course of the reaction a covalent bond is formed between an atom of the acylatable organic compound and the carbonyl carbon atom of one or more of the one or more acylating agents.

According to one or more embodiments of the inventive process, the one or more acylatable organic compounds comprise one or more aromatic compounds. In principle, there is no particular restriction as to the aromatic compounds which are preferably employed as acylatable organic compound according to the inventive process, provided that the aromatic compound may be acylated with the one or more acylating agents employed in step (b). Thus, by way of example, the aromatic compounds preferably used in step (b) may contain mononuclear aromatic ring and/or polynuclear condensed aromatic ring moieties, wherein preferably the aromatic compound comprises one or more mononuclear aromatic ring moieties, and even more preferably one aromatic ring moiety. According to specific embodiments of the present invention, the aromaticity of the aromatic compound is due to the presence of one or more mononuclear aromatic rings contained therein, and even more preferably due to the presence of a single mononuclear aromatic ring contained therein. Regarding the one or more aromatic ring moieties contained in the preferred aromatic compounds, there is no general restriction as to the type and number of ring members contained therein. Thus, by way of example, the one or more aromatic rings contained in the aromatic compounds may contain anywhere from 3 to 8 ring members, wherein, preferably, the aromatic ring contains from 4 to 7 ring members, and more preferably from 5 to 7 ring members. According to the present invention it is particularly preferred that the one or more aromatic rings contained in the aromatic compounds contain 5 and/or 6 ring members, preferably 6 ring members. According to particularly one or more embodiments, the preferred aromatic compounds comprise one or more condensed and/or uncondensed, and preferably uncondensed, 6-membered aromatic rings, and even more preferably one 6-membered aromatic ring.

There is no particular restriction according to the present invention as to the types of atoms contained as ring members of the preferred aromatic compounds, provided that the aromatic compound is suitable for being acylated by one or more of the one or more acylating agents employed in step (b). Thus, by way of example, the ring members may be selected from the group consisting of carbon, nitrogen, oxygen, sulfur, and combinations of two or more thereof, preferably from the group consisting of carbon, nitrogen, oxygen, and combinations of two or more thereof. According to particularly one or more embodiments, the ring members of the preferred aromatic compounds are carbon and/or nitrogen, and preferably carbon. With respect to the one or more compounds which may be used as the preferred aromatic compounds, these may by way of example be selected from the group consisting of furan, benzofuran, isobenzofuran, pyrrole, indole, isoindole, thiophene, benzothiophene, benzo[c]thiophene, imidazole, benzimidazole, purine, pyrazole, indazole, oxazole, benzoxazole, isoxazole, benzisoxazole, thiazole, benzothiazole, pyridine, quinoline, isoquinoline, pyrazine, quinoxaline, acridine, pyrimidine, quinazoline, pyridazine, cinnoline, benzene, naphthalene, anthracene, naphthacene, perylene, coronene, phenanthrene, and (further) heteroaromatic derivatives thereof. According to one or more embodiments of the present invention, the aromatic compounds comprise one or more compounds selected from the group consisting of benzene, naphthalene, and heteroaromatic derivatives thereof, wherein even more preferably the one or more acylatable aromatic compounds comprise benzene and/or naphtalene.

According to the present invention, the aromatic compounds preferably comprised among the one or more acylatable organic compounds may be substituted with one or more functional groups. In principle, according to the present invention there is no particular restriction as to the number or type of functional groups which may be present in the preferred aromatic compounds, provided that the aromatic compound is suitable for being acylated with one or more of the acylating agents provided in step (b). Thus, by way of example, the functional group may comprise one or more functional groups selected from the group consisting of OH, halides, OR, SR, $NH_2$, NHR, NRR', substituted and unsubstituted cyclic, linear, or branched alkyl, substituted and unsubstituted acyl, substituted or unsubstituted ester, and combinations of two or more thereof, wherein R and R' independently stand for substituted or unsubstituted alkyl which may respectively be cyclic, linear, or branched. According to one or more embodiments, the one or more functional groups comprise one or more functional groups selected from the group consisting of OH, F, Cl, OR, SR, $NH_2$, NHR, NRR', substituted and unsubstituted alkyl, substituted and unsubstituted acyl, substituted or unsubstituted ester, and combinations of two or more thereof, more preferably, one or more functional groups selected from the group consisting of OH, F, Cl, OR, SR, NHR, NRR', substituted and unsubstituted alkyl, substituted and unsubstituted acyl, and combinations of two or more thereof, more preferably one or more functional groups selected from the group consisting of OH, F, Cl, OR, SR, NHR, NRR', substituted and unsubstituted alkyl, substituted and unsubstituted acyl, and combinations of two or more thereof, more preferably one or more functional groups selected from the group consisting of OH, OR, SR, substituted and unsubstituted alkyl, substituted and unsubstituted acyl, and combinations of two or more thereof, wherein more preferably the one or more functional group comprises OR, SR, and/or alkyl which is substituted and/or unsubstituted, more preferably OR and/or SR, preferably OR, wherein independently from one another alkyl, R, and/or R' preferably stands for ($C_1$ to $C_6$)alkyl, more preferably ($C_1$ to $C_4$)alkyl, more preferably ($C_1$ to $C_3$)alkyl, more preferably ($C_1$ or $C_2$)alkyl, wherein even more preferably alkyl, R, and/or R' stands for $C_1$-alkyl, wherein substituted and/or unsubstituted methoxy, and particularly unsubstituted methoxy is particularly preferred.

As to the amount of functional groups with which the preferred aromatic compounds may be substituted, by way of example their number may range anywhere from 1 to 10, wherein preferably the preferred aromatic compounds are substituted with from 1 to 5 functional groups, more preferably with from 1 to 4, more preferably with from 1 to 3, more preferably with 1 or 2, and even more preferably with 1 functional group.

Thus, by way of example, regarding specific embodiments of the inventive process wherein one or more aromatic compounds are employed as one or more of the one or more acylatable organic compounds, one or more compounds are preferably used which are selected from the group consisting of respectively substituted and unsubstituted aromatic compounds, aromatic amine-containing compounds, phenolic compounds, aromatic monoethers, aromatic diethers, aromatic triethers, aromatic thioethers, and combinations of two or more thereof. According to particularly one or more embodiments, the one or more acylatable organic compounds comprise one or more compounds selected from the group consisting of benzene, toluene, fluorobenzene, chlorotoluenes, fluorotoluenes, trifluoromethoxybenzene, trichloromethoxybenzene, trifluoromethylthiobenzene, aniline, phenol, o-cresol, guaiacol, guetol, α-naphthol, β-naphthol, anisole, ethoxybenzene, propoxybenzene, isopropoxybenzene, butoxybenzene, isobutoxybenzene, 1-methoxynaphthalene, 2-methoxynaphthalene, 2-ethoxynaphthalene, 2-chloroanisole, 3-chloroanisole, 2-bromoanisole, 3-bromoanisole, 2-methylanisole, 3-methylanisole, 2-ethylanisole, 3-ethylanisole, 2-isopropylanisole, 3-isopropylanisole, 2-propylanisole, 3-propylanisole, 2-allylanisole, 2-butylanisole, 3-butylanisole, 2-benzylanisole, 2-cyclohexylanisole, 1-bromo-2-ethoxybenzene, 1-bromo-3-ethoxybenzene, 1-chloro-2-ethoxybenzene, 1-chloro-3-ethoxybenzene, 1-ethoxy-2-ethylbenzene, 1-ethoxy-3-ethylbenzene, 1-methoxy-2-allyloxybenzene, 2,3-dimethylanisole, 2,5-dimethylanisole, veratrole, 1,3-dimethoxybenzene, 1,4-dimethoxybenzene, 1,2-diethoxybenzene, 1,3-diethoxybenzene, 1,2-dipropoxybenzene, 1,3-dipropoxybenzene, 1,2-methylenedioxybenzene, 1,2-ethylenedioxybenzene, 1,2,3-trimethoxybenzene, 1,3,5-trimethoxybenzene, 1,3,5-triethoxybenzene, thioanisole, o-thiocresole, m-thiocresole, p-thiocresole, 2-thioethylnaphthalene, S-phenylthioacetate, 3-(methylmercapto)aniline, phenylthiopropionate, and combinations of two or more thereof. According to yet further particularly one or more embodiments, the one or more acylatable organic compounds are selected from the group consisting of benzene, toluene, isobutylbenzene, anisole, phenetole, veratrole, 1,2-methylenedioxybenzene, 2-methoxynaphthalene, thioanisole, and combinations of two or more thereof, more preferably from the group consisting of benzene, toluene, anisole, 2-methoxynaphthalene, thioanisole, and combinations of two or more thereof, wherein even more preferably the one or more acylatable compounds comprise anisole and/or 2-methoxynaphthalene.

Therefore, according to one or more embodiments of the inventive process for the acylation of an organic compound, the one or more acylatable organic compounds comprises one or more acylatable aromatic compounds, more preferably one or more compounds selected from the group consisting of substituted or unsubstituted benzene, naphthalene, anthracene, naphthacene, perylene, coronene, phenanthrene, and heteroaromatic derivatives thereof, preferably from the group consisting of substituted or unsubstituted benzene, naphthalene, and heteroaromatic derivatives thereof, more preferably from the group consisting of substituted or unsubstituted benzene and naphthalene, wherein more preferably the one or more acylatable aromatic compounds comprise substituted benzene and/or substituted naphthalene, and even more preferably anisole and/or 2-methoxynaphthalene.

With respect to the actual acylation of the acylatable compound in step (b) of the inventive process, there is no particular restriction as to the position or positions at which the one or more acylatable organic compounds are acylated, provided that a covalent bond is formed between the one or more acylatable organic compounds and a carbonyl carbon atom of one or more of the one or more acylating agents. According to one or more embodiments of the present invention wherein the one or more acylatable organic compounds comprise one or more aromatic compounds, any position of the aromatic compound may in principle be acylated, such that the one or more condensed and/or uncondensed aromatic rings contained in the aromatic compound may be acylated and/or one or more of the one or more functional groups contained in one or more of the aromatic compounds may equally or alternatively be acylated in step (b). In instances wherein one or more of the aromatic rings are acylated it is generally preferred that the one or more members of the aromatic ring subject to the acylation are members which are not optionally functionalized, and in particular which contain one or more hydrogen atoms which in step (b) are respectively substituted by one or more acylating agents.

According to a particularly preferred embodiment, one or more to the one or more condensed and/or uncondensed aromatic rings are acylated in step (b) of the inventive process, wherein in principle any one or more of the members of the one or more aromatic rings may by suitably acylated. In instances wherein one or more members of the one or more aromatic rings are suitably acylated, it is yet further preferred that one or more carbon and/or nitrogen atom members atom members of the one or more aromatic rings is suitably acylated, wherein it is even more preferred that one or more carbon atom members is suitably acylated.

As concerns the one or more acylating agents used in the inventive process, there is principally no restriction as to the type of compounds which may be used to this effect, provided that they may be suitably used to acylate one or more of the one or more acylatable organic compounds. Same applies accordingly with respect to the type of acyl moiety —C(O)R$^1$ contained in the acylating agent such that in principle any suitable aromatic or aliphatic, substituted or unsubstituted cyclic, linear, or branched organic group R$^1$ may be contained therein. According to one or more embodiments wherein R$^1$ is substituted or unsubstituted cyclic, linear, or branched alkyl, the size of the alkyl moiety may, by way of example, be comprised in the range of from $C_1$ to $C_{22}$, wherein preferably it is comprised in the range of from $C_1$ to $C_{20}$, more preferably in the range of from $C_1$ to $C_{18}$, more preferably of from $C_1$ to $C_{16}$, more preferably of from $C_1$ to $C_{14}$, more preferably of from $C_1$ to $C_{10}$, more preferably of from $C_1$ to $C_8$, more preferably of from $C_1$ to $C_6$, more preferably of from $C_1$ to $C_5$, more preferably of from $C_1$ to $C_4$, more preferably of from $C_1$ to $C_3$, wherein even more preferably the alkyl moiety is a $C_1$ or $C_2$ alkyl moiety, and particularly preferably a $C_2$ alkyl moiety. According to alternatively one or more embodiments wherein R$^1$ comprises an aromatic moiety, the aromatic group particularly preferably comprises substituted or unsubstituted benzyl and/or naphtyl, wherein even more preferably R$^1$ is substituted or unsubstituted benzyl or naphthyl.

As concerns one or more embodiments of the inventive process wherein the R$^1$ group is substituted, the one or more functional groups are preferably selected from the group consisting of OH, halogen, OR, nitro, and combinations of two or more thereof, wherein R and R' independently stand for substituted or unsubstituted alkyl which may respectively be cyclic, linear, or branched. More preferably the one or more functional groups are selected from the group consisting of halogen, OR, nitro, and combinations of two or more thereof, more preferably from the group consisting of Cl, F, Br, OR, nitro, and combinations of two or more thereof, more preferably more preferably from the group consisting of Cl, F, OR, nitro, and combinations of two or more thereof, more preferably from the group consisting of Cl, F, $C_1$ to $C_2$ alkoxy, nitro, and combinations of two or more thereof, more preferably from the group consisting of Cl, F, methoxy, nitro, and combinations of two or more thereof, wherein even more preferably the functional group is Cl. According to alternatively one or more embodiments, R$^1$ is unsubstituted.

In the inventive process it is particularly preferred that R$^1$ is optionally substituted linear or branched, saturated or unsaturated $C_1$ to $C_8$, preferably $C_1$ to $C_6$, more preferably $C_1$ to $C_4$, more preferably $C_1$ to $C_3$, and even more preferably $C_1$ or $C_2$, aliphatic moiety, wherein R$^1$ is preferably optionally substituted linear or branched alkyl, preferably $C_1$ to $C_6$ alkyl, more preferably $C_1$ to $C_5$ alkyl, more preferably $C_1$ to $C_4$ alkyl, more preferably $C_1$ to $C_3$ alkyl, more preferably $C_1$ or $C_2$ alkyl, and even more preferably optionally substituted $C_2$ alkyl, wherein more preferably R$^1$ is selected among the group consisting of linear or branched butyl, propyl, ethyl, and methyl, and wherein even more preferably R$^1$ is ethyl or methyl, and preferably ethyl.

According to the present invention, apart from being substituted with R$^1$, the second functionality of the carbonyl moiety contained in the acylating agent is X, such that the one or more acylating agents have the formula R$^1$—CO—X. As concerns the further substituent X, there is no particular limitation according to the present invention as to it's chemical nature, provided that one or more of the one or more acylating agents are suitable for acylating one or more of the one or more acylatable compounds in the acylation process of the present invention. Thus, —X as represented in the aforementioned chemical formula may represent an empty orbital, such that the acylating agent is an electrophilic species R$^1$—CO$^+$. In general, however, X represents a chemical functionality and/or at least a counter ion to the aforementioned electrophilic species R$^1$—CO$^+$. According to one or more embodiments, X is a functional group selected among the group consisting of halogen, hydroxyl, and —O—CO—R$^2$, wherein R$^2$ has the same meaning as R$^1$ according to the preferred and specific embodiments described in the foregoing with respect to the acyl moiety comprised in the one or more acylating agents. In particular, according to the inventive process, R$^2$ may be identical to or different than R$^1$. According to particularly one or more embodiments, X is selected among the group consisting of chloro, bromo, hydroxyl, and —O—CO—R$^2$, more preferably among the group consisting of chloro, bromo, and —O—CO—R$^2$, wherein even more preferably X is chloro or —O—CO—R$^2$, and preferably —O—CO—R$^2$. According to said preferred and particularly one or more embodiments, R$^2$ is preferably identical to R$^1$.

Thus according to specific embodiments of the inventive process, the one or more acylating agents comprise one or more compounds selected from the group consisting of acetic anhydride, propanoic anhydride, butyric anhydride, isobutyric anhydride, trifluoroacetic anhydride, benzoic anhydride, monochloroacetyl anhydride, dichloroacetyl anhydride, acetyl chloride, monochloroacetyl chloride, dichloroacetyl chloride, propanoyl chloride, isobutanoyl chloride, pivaloyl chloride, stearoyl chloride, crotonyl chloride, benzoyl chloride, chlorobenzoyl chloride, p-nitrobenzoyl chloride, methoxybenzoyl chloride, naphthoyl chloride, acetic acid, benzoic acid, and combinations of two or more thereof. According to yet further particularly one or more embodiments, the one or more acylating agents are selected from the group consisting of acetic anhydride, propanoic anhydride, benzoic anhydride, monochloroacetyl anhydride, dichloroacetyl anhydride, benzoyl chloride, and combinations of two or more thereof, wherein even more preferably the one or more acylating agents comprise acetic anhydride.

Thus, according to one or more embodiments of the inventive process for the acylation of an organic compound, the one or more acylating agents comprise one or more compounds of the formula $R^1$—CO—X, wherein
—CO— stands for a carbonyl moiety;
$R^1$ is optionally substituted linear or branched, saturated or unsaturated $C_1$ to $C_8$, preferably $C_1$ to $C_6$, more preferably $C_1$ to $C_4$, more preferably $C_1$ to $C_3$, and even more preferably $C_1$ or $C_2$, aliphatic moiety, wherein $R^1$ is preferably optionally substituted linear or branched alkyl, preferably $C_1$ to $C_6$ alkyl, more preferably $C_1$ to $C_5$ alkyl, more preferably $C_1$ to $C_4$ alkyl, more preferably $C_1$ to $C_3$ alkyl, more preferably $C_1$ or $C_2$ alkyl, and even more preferably optionally substituted $C_2$ alkyl, wherein more preferably $R^1$ is selected among the group consisting of linear or branched butyl, propyl, ethyl, and methyl, and wherein even more preferably $R^1$ is ethyl or methyl, and preferably ethyl; and
X is selected among the group consisting of halogen, hydroxyl, and —O—CO—$R^2$, wherein $R^2$ has the same meaning as $R^1$ and wherein $R^2$ may be identical to or different than $R^1$, wherein preferably X is selected among the group consisting of chloro, bromo, hydroxyl, and —O—CO—$R^2$, more preferably among the group consisting of chloro, bromo, and —O—CO—$R^2$, wherein even more preferably X is chloro or —O—CO—$R^2$, preferably —O—CO—$R^2$, wherein even more preferably $R^2$ is identical to $R^1$.

According to the present invention the catalyst provided in step (a) may in principle be used in any suitable form, provided that it is capable of catalyzing the acylation reaction. Thus, the acylation catalyst provided in step (a) which comprises one or more zeolitic materials having a BEA framework structure can be employed as such, such as by way of example in the form of a powder, a spray powder or a spray granulate.

When the inventive process is employed on an industrial scale, it is however preferable not to employ the acylation catalyst comprising the zeolitic material as powder or sprayed material but rather in the form of a molding.

Therefore, according to one or more embodiments of the inventive process, the catalyst comprising one or more zeolitic materials having a BEA framework structure is provided in the form of a molding.

In general, the powder or sprayed material can be shaped to form a molding without any other compounds, such as for example by suitable compacting, to obtain moldings of a desired geometry, such as in the form of tablets, cylinders, and/or spheres. The molding may however comprise all conceivable further compounds in addition to the one or more zeolitic materials comprised in the catalyst, provided that it is ensured that the resulting molding is capable of catalyzing the acylation reaction in step (b). According to said one or more embodiments, it is further preferred that at least one suitable binder material is used in the production of the molding. In the context of this preferred embodiment, more preferably a mixture of the catalyst comprising one or more zeolitic materials and the one or more binders is prepared. Suitable binders are in general all compounds which impart adhesion and/or cohesion between the one or more zeolitic materials which are to be bound, in particular beyond the physisorption which may be present without a binder. Examples of such binders are metal oxides, such as $SiO_2$, $Al_2O_3$, $TiO_2$, $ZrO_2$ or MgO, or clays or mixtures of two or more of these compounds. As $Al_2O_3$ binders, clay minerals and naturally occurring or synthetic aluminas, for example alpha-, beta-, gamma-, delta-, eta-, kappa-, chi- or theta-alumina and the inorganic or organometallic precursor compounds thereof, such as gibbsite, bayerite, boehmite, pseudoboehmite or trialkoxyaluminates, such as aluminum triisopropylate are preferred in particular. Further preferred binders are amphiphilic compounds having a polar and a nonpolar moiety, and graphite. Further binders are, for example, clays, such as montmorillonites, kaolins, bentonites, halloysites, dickites, nacrites or anaxites.

According to the present invention, the binders can be used as such for the production of a molding. In the context of the present invention, it is however also possible to use compounds from which the binder is formed in at least one further step in the production of the moldings. Examples of such binder precursors are tetraalkoxysilanes, tetraalkoxytitanates, tetraalkoxyzirconates or a mixture of two or more different tetraalkoxysilanes or a mixture of two or more different tetraalkoxytitanates or a mixture of two or more different tetraalkoxyzirconates or a mixture of at least one tetraalkoxysilane and at least one tetraalkoxytitanate or of at least one tetraalkoxysilane and at least one tetraalkoxyzirconate or of at least one tetraalkoxytitanate and at least one tetraalkoxyzirconate or a mixture of at least one tetraalkoxysilane and at least one tetraalkoxytitanate and at least one tetraalkoxyzirconate. In the context of the present invention, binders which either completely or partly consist of $SiO_2$ or are a precursor of $SiO_2$, from which $SiO_2$ is formed in at least one further step in the production of the moldings are to be mentioned. In this context, both colloidal silica and "wet process" silica as well as "dry process" silica can be used. These are very particularly preferably amorphous silica, the size of the silica particles being, for example, in the range of from 5 to 100 nm and the surface of the silica particles being in the range of from 50 to 500 m²/g. Colloidal silica, preferably in the form of an alkaline and/or ammoniacal solution, more preferably in the form of an ammoniacal solution, is, for example, commercially available as, inter alia, Ludox®, Syton®, Nalco® or Snowtex®. "Wet process" silica is, for example, commercially available, inter alia, as Hi-Sil®, Ultrasil®, Vulcasil®, Santocel®, Valron-Estersil®, Tokusil® or Nipsil®. "Dry process" silica is, for example, commercially available, inter alia, as Aerosil®, Reolosil®, Cab-O-Sil®, Fransil® or Arc-Silica®. The binders are preferably used in an amount which leads to the finally resulting moldings whose binder content is up to 80% by weight, more preferably in the range of from 5 to 80% by weight, more preferably in the range of from 10 to 70% by weight, more preferably in the range of from 10 to 60% by weight, more preferably in the range of from 15 to 50% by weight, more preferably in the range of from 15 to 45% by weight, particularly preferably in the range of from 15 to 40% by weight, based in each case on the total weight of the finally resulting molding.

In principle, the molding comprising the acylation catalyst of the present invention may be obtained according to any suitable procedure, provided that the molding may catalyze the acylation in step (b) of the inventive process. According to one or more embodiments of the present invention, the molding is obtainable and preferably obtained according to a process for the production of a molding comprising the steps of (I) preparing of a mixture containing the acylation catalyst comprising the one or more zeolitic materials, and optionally at least one binder;
(II) optionally kneading of the mixture;
(III) molding of the kneaded mixture to give at least one molding;
(IV) optionally drying of the at least one molding; and/or
(V) optionally calcining of the at least one dried molding.

The term "finally resulting molding" as used in the context of the present invention relates to a molding as obtainable and preferably obtained from the optional drying and/or calcining steps (IV) and/or (V), particularly preferably as obtainable and preferably obtained from step (IV). Therefore, the mixture of binder or precursor of a binder and the catalyst comprising one or more zeolitic materials can be mixed with at least one further compound for further processing and for the formation of a plastic material. Here, inter alia, pore formers may preferably be mentioned. In the process of the present invention, all compounds which, with regard to the finished molding, provide a certain pore size and/or a certain pore size distribution and/or certain pore volumes can be used as pore formers. Preferably used pore formers in the process of the present invention are polymers which are dispersible, suspendable or emulsifiable in water or in aqueous solvent mixtures. Preferred polymers here are polymeric vinyl compounds, for example polyacylene oxides, such as polyethylene oxides, polystyrene, polyacrylates, polymethacrylates, polyolefins, polyamides and polyesters, carbohydrates, such as cellulose or cellulose derivatives, for example methylcellulose, or sugars or natural fibers. Further suitable pore formers are, for example, pulp or graphite. If pore formers are used in the preparation of the mixture according to (I), the pore former content, preferably the polymer content of the mixture according to (I) is preferably in the range of from 5 to 90% by weight, preferably in the range of from 15 to 75% by weight, and particularly preferably in the range of from 25 to 55% by weight, based in each case on the amount of the one or more zeolitic materials in the mixture according to (I). If desired for the pore size distribution to be achieved, a mixture of two or more pore formers may also be used. In a preferred embodiment of the process of the present invention, the pore formers are removed in a step (V) by calcination to give the porous molding. According to the present invention, however, it is particularly preferred that the molding obtained in step (III) is subsequently not subject to a calcination step. With respect to the calcination of the molding preferably used in the inventive process, the term "calcination" refers to a calcination step as defined in the foregoing with respect to the one or more zeolitic materials. Therefore, according to specific embodiments of the present invention wherein the molding obtained in step (III) is subsequently not subject to a calcination step, it is accordingly preferred according to said embodiments either not to employ a pore former or, alternatively, to use one or more pore formers which may be suitably removed either by a heating step which is not a calcination step within the meaning of the present invention and/or which may be removed by other means than by suitable heating of the preferred molding containing one or more pore formers.

In the context of a likewise preferred embodiment of the present invention, at least one pasting agent is added in the preparation of the mixture according to (I). Pasting agents which may be used are all compounds suitable for this purpose. These are preferably organic, in particular hydrophilic polymers, for example cellulose, cellulose derivatives, such as methylcellulose, starch, such as potato starch, wallpaper paste, polyacrylates, polymethacrylates, polyvinyl alcohol, polyvinylpyrrolidone, polyisobutene or polytetrahydrofuran. Accordingly, particular compounds which also act as pore formers can be used as pasting agents. In a particularly preferred embodiment of the process of the present invention as described below, these pasting agents are removed in a step (V) by calcination to give the porous molding. According to the present invention, however, it is particularly preferred that the molding obtained in step (III) is subsequently not subject to a calcination step. Therefore, according to specific embodiments of the present invention wherein the molding obtained in step (III) is subsequently not subject to a calcination step, it is accordingly preferred according to said embodiments either not to employ a pasting agent or, alternatively, to use one or more pasting agents which may be suitably removed either by a heating step which is not a calcination step within the meaning of the present invention and/or which may be removed by other means than by suitable heating of the preferred molding containing one or more pasting agents.

According to a further embodiment of the present invention, at least one acidic additive may added during the preparation of the mixture according to (I). In this respect organic acidic compounds are preferred which can be removed in an optional calcination step (V). Carboxylic acids, for example formic acid, oxalic acid and/or citric acid, are particularly preferred. It is also possible to use two or more of these acidic compounds. As for the aforementioned pore formers and pasting agents, however, it is preferred to use one or more acidic additives and preferably one or more organic acidic compounds which may be removed either by a heating step which is not a calcination step within the meaning of the present invention and/or which may be removed by other means than by suitable heating of the preferred molding containing one or more acidic additives, preferably one or more organic acidic compounds.

The order of addition of the components of the mixture according to (I) which contains the acylation catalyst comprising the one or more zeolitic materials having a BEA framework structure is not critical. In particular is both possible first to add the at least one binder, then the at least one pore former and the at least one acidic compound and finally the at least one pasting agent and to interchange the sequence with regard to the at least one binder, the at least one pore former, the at least one acidic compound and the at least one pasting agent.

After the addition of the binder to the acylation catalyst comprising the zeolitic materials to which, if appropriate, at least one of the compounds described above have already been added, the mixture according to (I) is normally homogenized for from 10 to 180 minutes. Inter alia, kneaders, edge mills or extruders are particularly preferably used for the homogenization. The mixture is preferably kneaded. On the industrial scale, treatment in an edge mill is preferably employed for the homogenization. The homogenization is carried out as a rule at temperatures in the range of from about 10° C. to the boiling point of the pasting agent and normal pressure or slightly superatmospheric pressure. Thereafter, if appropriate, at least one of the compounds described above can be added. The mixture thus obtained is homogenized, preferably kneaded, until an extrudable plastic material has formed.

According to the preferred process of the present invention for the production of a molding, the homogenized mixture is subsequently molded. In the context of the present invention, those processes in which the molding is effected by extrusion in conventional extruders, for example to give extrudates having a diameter of preferably from 1 to 10 mm, particularly preferably from 2 to 5 mm, are preferred for the shaping processes. Such extrusion apparatuses are described, for example, in Ullmann's Enzyklopädie der Technischen Chemie, 4th Edition, Vol. 2, page 295 et seq., 1972. In addition to the use of a screw-type extruder, a plunger-type extruder is also preferably used for the molding. In principle, however, all known and/or suitable kneading and molding apparatuses and processes may be used for the shaping. Examples of these are inter alia: briquetting, i.e. mechanical compression with or without addition of additional binder material; pelleting, i.e. compacting by circular and/or rotational movements; sintering, i.e. the material to be molded is subjected to a thermal treatment. The shape of the moldings produced according to the invention can be chosen as desired. In particular, inter alia spheres, oval shapes, cylinders or tablets are possible.

In the context of the present invention, step (III) is preferably followed by at least one drying step. In principle, any suitable drying step may be used, provided that a dry molding is provided. According to the present invention it is however preferred that the drying step does not involve temperatures used in a calcination step within the meaning of the present invention.

In the context of the present invention, an optional drying step (IV) is optionally followed by at least one calcination step (V). According to certain embodiments, a calcination step (V) is directly carried out after the molding step (III). According to the present invention it is however preferred that the preferred molding containing the acylation catalyst comprising the one or more zeolitic materials having the BEA framework structure is not subject to a calcination step (V) subsequently to the optional drying step (IV), wherein according to said specific embodiments not involving a calcination step (V) it is preferred that the production process comprises one or more drying steps (IV) subsequently to the molding step (III).

According to embodiments wherein the preferred molding is obtainable and preferably obtained according to the aforementioned preferred method for the production of a molding which comprises one or more calcination steps (V), the calcination may be generally carried out at any temperature as defined within the meaning of the present invention, wherein it is preferably carried out at temperatures in the range of from 300 to 700° C., and more preferably from 400 to 600° C. According to said embodiments, the calcination can be effected under any suitable gas atmosphere, air and/or lean air being preferred. Furthermore, the calcination is preferably carried out in a muffle furnace, a rotary kiln and/or a belt calcination oven. It is possible for the temperatures during a calcination step to remain constant or to be changed continuously or discontinuously. If calcination is effected twice or more often, the calcination temperatures can be different or identical in the individual steps.

Before and/or after the optional drying step (IV) and/or before and/or after the optional calcination step (V), the at least one molding can, if appropriate, be treated with a concentrated or dilute Broenstedt acid or a mixture of two or more Broenstedt acids. Suitable acids are, for example, hydrochloric acid, sulfuric acid, phosphoric acid, nitric acid or carboxylic acids, dicarboxylic acids or oligo- or polycarboxylic acids, such as nitrilotriacetic acid, sulfosalicylic acid or ethylenediaminetetraacetic acid. If appropriate, this at least one treatment with at least one Broenstedt acid is followed by at least one drying step (IV) and/or at least one calcination step (V).

According to a further embodiment of the process of the present invention, the moldings preferably provided in step (a) and used in step (b) can, for better hardening, be subject to a water steam treatment, after which preferably drying is effected at least once again and/or calcination is effected at least once again. For example, after at least one drying step and at least one subsequent calcination step, the calcined molding is subjected to the steam treatment and is then dried at least once again and/or calcined at least once again.

In addition to the aforementioned, the present invention also relates to the use of the zeolitic material having a BEA framework structure according to the embodiments and one or more embodiments of the inventive zeolitic material as a catalyst, in particular of a zeolitic material which is obtainable according to the embodiments and one or more embodiments of the inventive process for the preparation of a zeolitic material, and more preferably of a zeolitic material a obtained from said embodiments and one or more embodiments of the inventive process. In principle, no limitations apply to the types of reactions in which the inventive zeolitic material may be employed, provided that it is effective at least partly lowering the activation energy in a given chemical reaction. According to the present invention it is however preferred that the zeolitic material is employed as a catalyst for the conversion of organic compounds. In this respect, there is again no particular limitation as to the use of the inventive zeolitic material, such that the conversion may concern a single organic compound which is chemically transformed to a further chemical compound and preferably to a derivative and/or isomer of the original compound, and/or wherein a single organic compound is chemically transformed to two or more chemically distinct reaction products. According to particularly one or more embodiments, however, the inventive zeolitic material is used as a catalyst in a chemical reaction involving two or more chemical compounds, and preferably two chemical compounds, which are reacted with one another to form one or more and preferably one chemical compound as the reaction product.

According to one or more embodiments of the inventive use involving the chemical conversion of a compound to a further chemical compound and/or the formation of a new chemical compound from the reaction of two or more precursor compounds, it is particularly preferred that said reactions involve the formation of one or more carbon-carbon single and/or double bonds, and preferably one or more carbon-carbon single bonds, wherein said bonds are formed between two carbon atoms which were previously not bound to one another by a carbon-carbon bond. According to particularly one or more embodiments, the chemical conversion of an organic compound comprises an acylation reaction, and more preferably an acylation reaction comprising a reaction between one or more acylatable organic compounds and one or more acylating agents as defined in the foregoing according to any of the embodiments and one or more embodiments of the inventive process for the acylation of an organic compound.

Therefore, the present invention further relates to the use of a zeolitic material having a BEA framework structure according to embodiments and one or more embodiments of the present invention relating to a zeolitic material and to a process for the preparation of a zeolitic material, wherein the zeolitic material having a BEA framework structure is preferably used as a catalyst for the conversion of organic compounds, more preferably as a catalyst in a reaction in which one or more carbon-carbon single and/or double bonds, preferably one or more carbon-carbon single bonds, are formed between two carbon atoms which were previously not bound to one another by a carbon-carbon bond. Furthermore, according to specific embodiments of the inventive use, the conversion of organic compounds is preferably an acylation reaction, and even more preferably an acylation reaction including one or more acylatable organic compounds and one or more acylating agents as the reagents.

The present invention includes the following embodiments, wherein these include the specific combinations of embodiments as indicated by the respective interdependencies defined therein:

1. A process for the preparation of a zeolitic material having a BEA framework structure comprising the steps of:
   (i) providing one or more zeolitic materials having a BEA framework structure, wherein the BEA framework structure comprises $YO_2$ and $X_2O_3$, wherein Y is a tetravalent element, and X is a trivalent element;
   (ii) subjecting the one or more zeolitic materials provided in step (i) to a procedure for removing at least a portion of X, preferably tetrahedrally coordinated X, from the BEA framework structure;
   wherein the Y:X molar ratios of the one or more zeolitic materials provided in step (i) are respectively comprised in the range of from 1 to 50, preferably of from 1.5 to 35, more preferably of from 2 to 25, more preferably of from 2.5 to 15, more preferably of from 3 to 10, more preferably of from 3.5 to 7, more preferably of from 4 to 6, and even more preferably in the range of from 4 to 5.
2. The process of embodiment 1, wherein Y is selected from the group consisting of Si, Sn, Ti, Zr, Ge, and combinations of two or more thereof, Y preferably being Si.
3. The process of embodiment 1 or 2, wherein X is selected from the group consisting of Al, B, In, Ga, and combinations of two or more thereof, X preferably being Al and step (ii) preferably comprising a dealumination step.
4. The process of any of embodiments 1 to 3, wherein the one or more zeolitic materials provided in step (i) are obtainable, and preferably obtained, from an organotemplate-free synthetic process.
5. The process of any of embodiments 1 to 4, wherein the one or more zeolitic materials provided in step (i) are non-calcined.
6. The process of any of embodiments 1 to 5, wherein the BET surface area determined according to DIN 66135 of the one or more zeolitic materials provided in step (i) ranges from 200 to 700 m$^2$/g, preferably from 400 to 650 m$^2$/g, more preferably from 475 to 575 m$^2$/g, more preferably from 500 to 550 m$^2$/g, and even more preferably from 510 to 530 m$^2$/g,
   wherein the one or more zeolitic materials are preferably non-calcined.
7. The process of any of embodiments 1 to 6, wherein the one or more zeolitic materials comprise zeolite Beta.
8. The process of any of embodiments 1 to 7, wherein the one or more zeolitic materials provided in step (i) comprises one or more alkali metals M, preferably one or more alkali metals M selected from the group consisting of Li, Na, and K, wherein more preferably the one or more alkali metals M comprise Na and/or K, more preferably Na, and wherein even more preferably M is Na.
9. The process of embodiment 8, wherein the molar ratio of M:X ranges from 0.01 to 20, preferably from 0.05 to 10, more preferably from 0.1 to 5, more preferably from 0.5 to 2, more preferably from 0.7 to 1.5, more preferably from 0.8 to 1.3, and even more preferably from 0.9 to 1.1.
10. The process of embodiment 8 or 9, wherein prior to the procedure in step (ii) at least a portion of the alkali metal atoms M contained in the one or more zeolitic materials provided in step (i) is exchanged with H$^+$ and/or NH$_4^+$, preferably with NH$_4^+$.
11. The process of any of embodiments 8 to 10, wherein the ion-exchange process is conducted at a pH in the range of from 0 to 7, preferably of from 1 to 6, more preferably of from 1 to 4, more preferably of from 1.5 to 3.5, more preferably of from 2 to 3.5, and even more preferably of from 2.5 to 3.5.
12. The process of any of embodiments 1 to 11, wherein the procedure in step (ii) for removing at least a portion of X from the BEA framework structure comprises one or more steam-treatment steps (S).
13. The process of embodiment 12, wherein the one or more steam-treatment steps (S) are conducted at a temperature of from 200 to 1,000° C., preferably of from 300 to 900° C., preferably of from 400 to 800° C., preferably of from 500 to 700° C., and even more preferably of from 550 to 650° C.
14. The process of embodiment 12 or 13, wherein the one or more steam-treatment steps (S) are conducted for a duration of from 0.1 to 48 h, preferably of from 0.2 to 24 h, more preferably of from 0.3 to 12 h, more preferably of from 0.35 to 6 h, more preferably of from 0.4 to 4 h, more preferably of from 0.45 to 2 h, and even more preferably of from 0.5 to 1.5 h.
15. The process of any of embodiments 12 to 14, wherein the one or more steam-treatment steps (S) are conducted using a steam concentration of from 5 to 75 vol.-%, preferably of from 10 to 50 vol.-%, and more preferably of from 15 to 25 vol.-%, wherein the remaining volume is preferably an inert gas, more preferably nitrogen.
16. The process of any of embodiments 12 to 15, wherein the procedure in step (ii) further comprises subjecting the one or more zeolitic materials obtained from the one or more steam-treatment steps (S) to one or more acid-treatment steps (A).
17. The process of embodiment 16, wherein the one or more acid-treatment steps (A) involve contacting the one or more zeolitic materials with an acidic solution having a pH of 4 or less, preferably of 3.5 or less, wherein preferably the pH is in the range of from −1.5 to 3, more preferably of from −1 to 2.5, more preferably of from −0.5 to 2, more preferably of from −0.5 to 1, and even more preferably of from −0.5 to 0.5.
18. The process of embodiment 16 or 17, wherein the one or more acid-treatment steps (A) involve contacting the one or more zeolitic materials with an acidic solution at a temperature of from 50 to 100° C., preferably of from 60 to 95° C., more preferably of from 70 to 90° C., and even more preferably of from 75 to 85° C.
19. The process of embodiment 18, wherein the one or more acid-treatment steps (A) involve contacting the one or more zeolitic materials with an acidic solution for a period of from 0.25 to 5 h, preferably of from 0.5 to 4.5 h, more preferably of from 1 to 4 h, more preferably of from 1 to 3.5 h, and even more preferably of from 1.5 to 3.5 h.
20. The process of any of embodiments 1 to 19, wherein the procedure in step (ii) for removing at least a portion of X from the BEA framework structure comprises one or more calcination steps (C).
21. The process of embodiment 20, wherein the one or more calcination steps (C) are conducted at a temperature of from 450 to 800° C., preferably of from 550 to 750° C., more preferably of from 600 to 720° C., and even more preferably of from 620 to 700° C.

22. The process of embodiment 20 or 21, wherein the one or more calcination steps (C) are conducted for a period ranging from 0.5 to 10 h, preferably of from 1 to 6 h, and even more preferably of from 1.5 to 3 h.
23. The process of any of embodiments 1 to 22, wherein step (ii) is repeated one or more times, preferably 1 to 5 times, more preferably 1 to 3 times, more preferably 1 or 2 times, and even more preferably 2 times.
24. The process of embodiment 23, wherein the repetition of step (ii) comprises the repetition of one or more of the one or more calcination steps (C) according to any of embodiments 22 to 25.
25. The process of embodiment 23 or 24, wherein prior to repeating step (ii), at least part of the non-framework ions respectively present in the one or more zeolitic materials are exchanged with one or more cations and/or cationic elements, wherein the one or more cation and/or cationic elements preferably comprise $H^+$ and/or $NH_4^+$, wherein even more preferably at least part of the non-framework ions are exchange with $NH_4^+$.
26. The process of embodiment 25, wherein the non-framework ions comprise X, preferably X which has been removed from the BEA framework structure in a previous step (ii).
27. A zeolitic material having a BEA framework structure obtainable and/or obtained according to any one of embodiments 1 to 26.
28. A zeolitic material having a BEA framework structure, optionally obtainable and/or obtained according to any of embodiments 1 to 27, wherein the BEA framework structure comprises $YO_2$ and $X_2O_3$, wherein Y is a tetravalent element, and X is a trivalent element, and wherein the $^1H$ MAS NMR of the zeolitic material comprises:
  a first peak (P1) in the range of from 0.40 to 1.00 ppm, preferably of from 0.50 to 0.90 ppm, more preferably of from 0.60 to 0.80 ppm, and even more preferably of from 0.65 to 0.75 ppm;
  a second peak (P2) in the range of from 1.40 to 2.00 ppm, preferably of from 1.50 to 1.90 ppm, more preferably of from 1.60 to 1.80 ppm, and even more preferably of from 1.65 to 1.75 ppm; and
  a third peak (P3) in the range of from 2.30 to 2.90 ppm, preferably of from 2.40 to 2.80 ppm, more preferably of from 2.50 to 2.70 ppm, and even more preferably of from 2.55 to 2.65 ppm;
  wherein the integration of the first, second, and third peaks in the $^1H$ MAS NMR of the zeolitic material offers a ratio of the integration values P1:P2:P3 of 1:(0.5-1.2):(0.30-2.5), preferably of 1:(0.6-1.1):(0.50-1.5), more preferably of 1:(0.65-1): (0.60-1.2), more preferably of 1:(0.7-0.95):(0.70-1), more preferably of 1:(0.75-0.9):(0.75-0.9), and even more preferably of 1:(0.8-0.85):(0.8-0.85).
29. The zeolitic material of embodiment 27 or 28, wherein the $^1H$ MAS NMR of the zeolitic material does not include a peak in the range of from 3.85 to 3.95 ppm, preferably of from 3.80 to 4.00 ppm, more preferably of from 3.70 to 4.10 ppm, and even more preferably of from 3.60 to 4.20 ppm, having an integration value of 100% or more of the integration value of the first, second, and/or third peaks, preferably of 50% or more, more preferably of 20% or more, more preferably of 10% or more, more preferably of 5% or more, more preferably of 1% or more, more preferably of 0.1% or more, and even more preferably of 0.01% or more of the integration value of the first, second, and/or third peaks.

30. The zeolitic material of any of embodiments 27 to 29, wherein Y is selected from the group consisting of Si, Sn, Ti, Zr, Ge, and combinations of two or more thereof, Y preferably being Si.
31. The zeolitic material of any of embodiments 27 to 30, wherein X is selected from the group consisting of Al, B, In, Ga, and combinations of two or more thereof, X preferably being Al.
32. The zeolitic material of any of embodiments 27 to 31, wherein the Y:X molar ratio of the zeolitic material is comprised in the range of from 2 to 60, preferably of from 3 to 40, more preferably of from 4 to 20, more preferably of from 5 to 15, more preferably of from 6 to 10, and even more preferably of from 6.5 to 7.5.
33. The zeolitic material of any of embodiments 27 to 32, wherein the zeolitic material comprises zeolite Beta.
34. The zeolitic material of any of embodiments 27 to 33, wherein the zeolitic material has an X-ray diffraction pattern comprising at least the following reflections:

| Intensity (%) | Diffraction angle 2θ/° [Cu K(alpha 1)] |
|---|---|
| [8-28] | [21.24-21.44] |
| 100 | [22.28-22.48] |
| [5-25] | [25.18-25.38] |
| [5-25] | [26.88-27.08] |
| [4-24] | [28.62-28.82] |
| [8-28] | [29.42-29.62] |
| [1-21] | [33.09-33.49] |
| [3-23] | [43.28-43.68] | wherein 100% relates to the intensity of the maximum peak in the X-ray powder diffraction pattern.
35. The process of embodiment 34, wherein the X-ray diffraction pattern comprises the following reflection:

| Intensity (%) | Diffraction angle 2θ/° [Cu K(alpha 1)] |
|---|---|
| [1-17] | [25.77-25.97] |

36. A process for the acylation of an organic compound comprising:
  (a) providing a catalyst comprising one or more zeolitic materials having a BEA framework structure,
  (b) contacting the catalyst with one or more acylatable organic compounds in the presence of one or more acylating agents in one or more reactors for obtaining one or more acylated organic compounds,
  wherein the one or more zeolitic materials is a zeolitic material having a BEA framework structure according to any of embodiments 27 to 35.
37. The process of embodiment 36, wherein the one or more acylatable organic compounds comprises one or more acylatable aromatic compounds, more preferably one or more compounds selected from the group consisting of substituted or unsubstituted benzene, naphthalene, anthracene, naphthacene, perylene, coronene, phenanthrene, and heteroaromatic derivatives thereof, preferably from the group consisting of substituted or unsubstituted benzene, naphthalene, and heteroaromatic derivatives thereof, more preferably from the group consisting of substituted or unsubstituted benzene and naphthalene, wherein more preferably the one or more acylatable aromatic compounds comprise substituted benzene and/or substituted naphthalene, and even more preferably anisole and/or 2-methoxynaphthalene.

38. The process of embodiment 36 or 37, wherein the one or more acylating agents comprise one or more compounds of the formula $R^1$—CO—X, wherein
—CO— stands for a carbonyl moiety;
$R^1$ is optionally substituted linear or branched, saturated or unsaturated $C_1$ to $C_8$, preferably $C_1$ to $C_6$, more preferably $C_1$ to $C_4$, more preferably $C_1$ to $C_3$, and even more preferably $C_1$ or $C_2$, aliphatic moiety, wherein $R^1$ is preferably optionally substituted linear or branched alkyl, preferably $C_1$ to $C_6$ alkyl, more preferably $C_1$ to $C_5$ alkyl, more preferably $C_1$ to $C_4$ alkyl, more preferably $C_1$ to $C_3$ alkyl, more preferably $C_1$ or $C_2$ alkyl, and even more preferably optionally substituted $C_2$ alkyl, wherein more preferably $R^1$ is selected among the group consisting of linear or branched butyl, propyl, ethyl, and methyl, and wherein even more preferably $R^1$ is ethyl or methyl, and preferably ethyl; and
X is selected among the group consisting of halogen, hydroxyl, and —O—CO—$R^2$, wherein $R^2$ has the same meaning as $R^1$ and wherein $R^2$ may be identical to or different than $R^1$, wherein preferably X is selected among the group consisting of chloro, bromo, hydroxyl, and —O—CO—$R^2$, more preferably among the group consisting of chloro, bromo, and —O—CO—$R^2$, wherein even more preferably X is chloro or —O—CO—$R^2$, preferably —O—CO—$R^2$, wherein even more preferably $R^2$ is identical to $R^1$.

39. Use of a zeolitic material having a BEA framework structure according to any of embodiments 27 to 35 as a catalyst, preferably as a catalyst for the conversion of organic compounds, more preferably as a catalyst in a reaction in which one or more carbon-carbon single and/or double bonds, preferably one or more carbon-carbon single bonds, are formed between two carbon atoms which were previously not bound to one another by a carbon-carbon bond.

40. The use according to embodiment 39, wherein the conversion of organic compounds is an acylation reaction, preferably an acylation reaction including one or more acylatable organic compounds and one or more acylating agents as the reagents.

BRIEF DESCRIPTION OF THE FIGURES

FIG. 1a further includes the respective line patterns of zeolite Beta obtained from template mediated synthesis and of mordenite for comparison.

FIG. 2a further includes the respective line patterns of zeolite Beta obtained from template mediated synthesis, of zeolite P, and of the zeolite ECR-1 for comparison.

FIG. 2c further includes the respective line patterns of boron-zeolite Beta obtained from template mediated synthesis and of mordenite for comparison.

EXAMPLES

Example 1

23.95 g of $NaAlO_2$ were dissolved in 0.812 kg of $H_2O$, followed by addition of 9.01 g of Al-beta zeolite seed crystals (CP814C zeolite Beta from Zeolyst International) under stirring. 1,154.69 g of sodium-water glass solution (26 wt.-% $SiO_2$ and 8 wt.-% $Na_2O$) were then slowly added to the mixture, wherein after adding 10-20 g of the sodium-water glass solution a clear gel is produced which is then dissolved after further addition of the solution.

The mixture was then transferred into an autoclave and crystallized at 120° C. for 120 h. After having let the reaction mixture cool to room temperature, it was filtered and the solid residue repeatedly washed with distilled water, after which it was dried at 120° C. for 16 h thus affording 85 g of a white crystalline product. The product displayed a crystallinity grade of 90% compared to the Al-beta zeolite used in synthesis.

Elemental analysis of the crystalline product obtained from hydrothermal synthesis afforded Na:Si:Al molar ratios of 1.0:4.6:1.

Figure 1A:
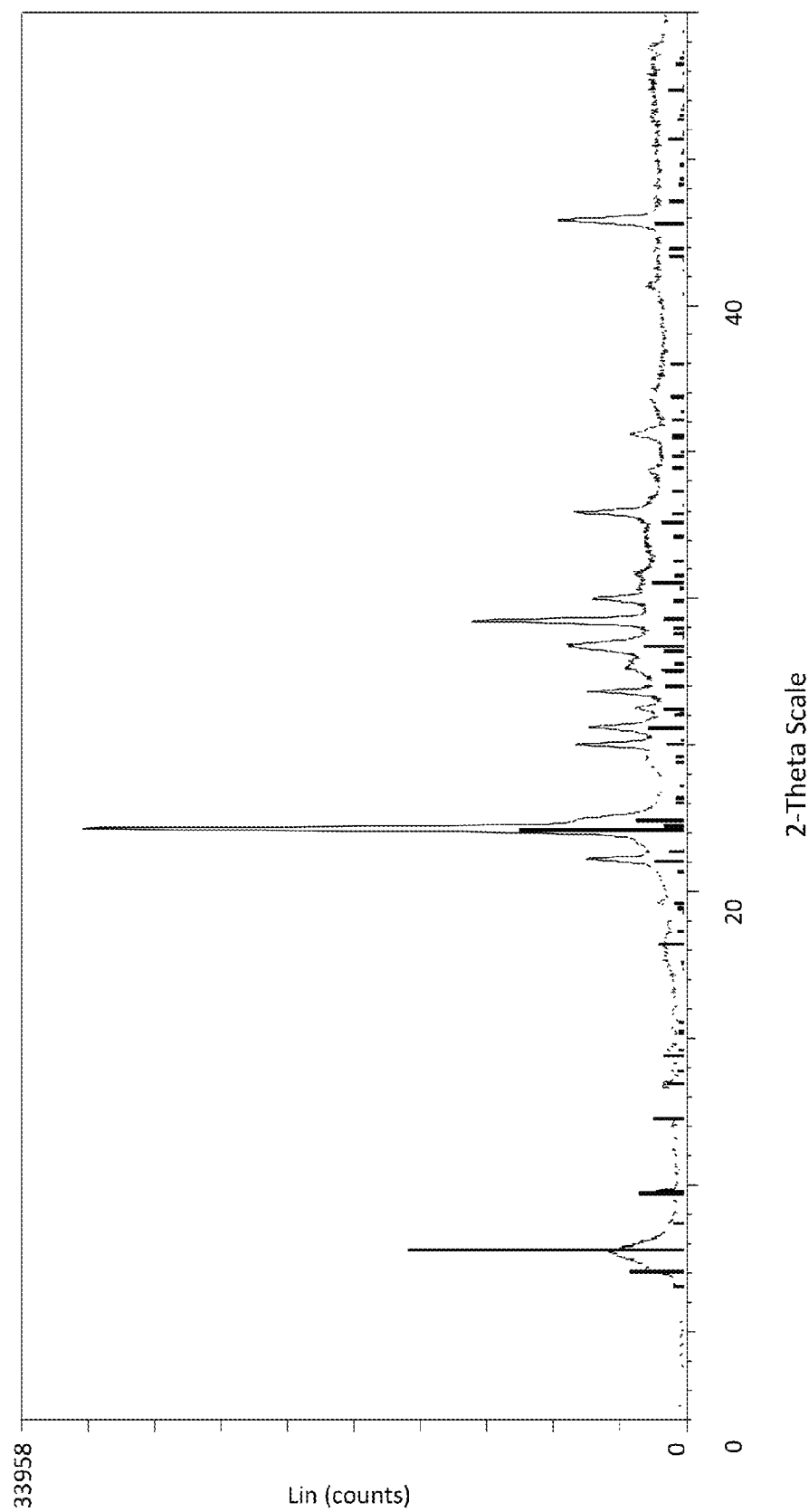
FIG. 1a shows the X-ray diffraction (XRD) pattern (measured using Cu K alpha-1 radiation) of the zeolitic material obtained from hydrothermal synthesis in Example 1. In the figure, the diffraction angle 2 theta in ° is shown along the abscissa and the intensities are plotted along the ordinate.
Figure 3:
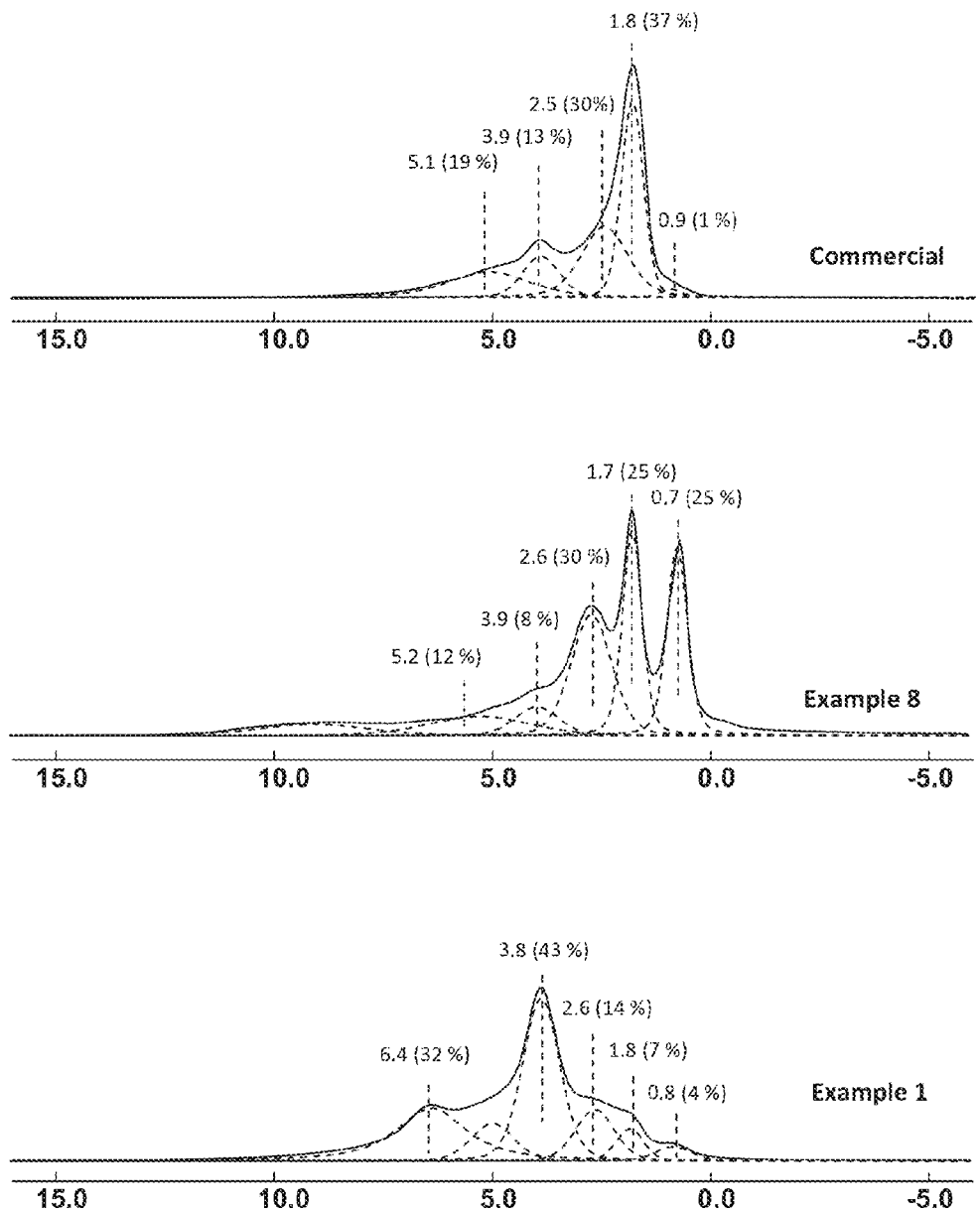
FIG. 3 shows the (deconvoluted) 1H MAS NMR obtained from a commercial zeolite Beta (top), as well as from the samples from Examples 8 ($2^{nd}$ from the top) and 1 (bottom), respectively. In the figure, the values in ppm are plotted along the abscissa, wherein the exact ppm values are indicated above the respective peaks, including the relative intensities from deconvolution in % in parentheses.

In FIG. 1a, the XRD of the washed and dried crystalline product obtained from hydrothermal synthesis is displayed. In particular, the XRD pattern is typical for a BEA framework structure. Furthermore, the (deconvoluted) ¹H MAS NMR spectrum of the crystalline product obtained from hydrothermal synthesis is displayed in FIG. 3.

The zeolitic product obtained from hydrothermal synthesis was then subject to an ion-exchange treatment wherein 50 ml of a 4M ammonium nitrate solution were added to the zeolite per 1 g of the zeolite, and the resulting mixture was heated to 80° C. under stirring for 1 h. After filtration and washing of the resulting product, the procedure was repeated twice. Finally, the resulting product was calcined at 350° C. for 5 h to obtain the final ion-exchanged product.

Figure 1B:
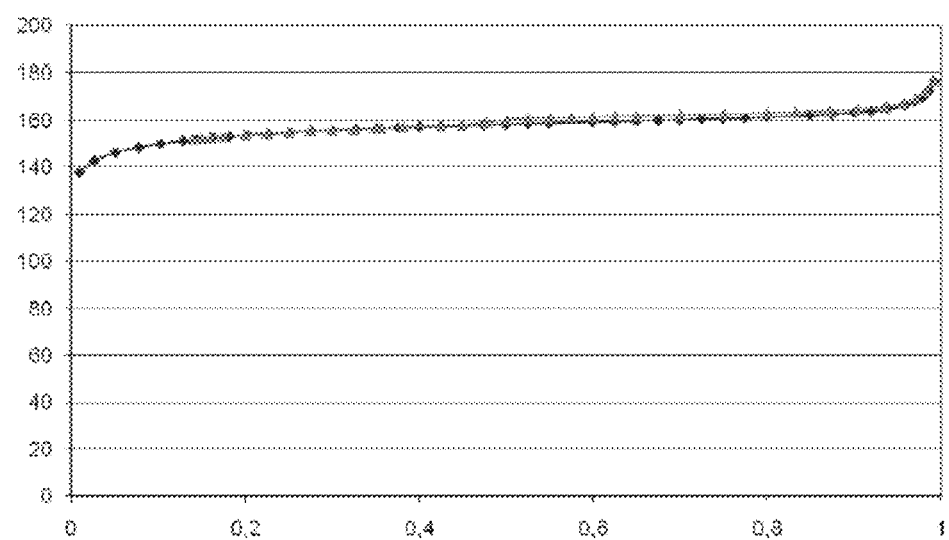
FIG. 1b shows the nitrogen adsorption isotherm of the ion-exchanged zeolitic material obtained in Example 1. In the figure, the relative pressure p/p° is plotted along the abscissa and the pore volume in cm³/g STP (standard pressure and temperature), determined according to DIN 66134 at 77 K, is plotted along the ordinate. The values for the adsorption are indicated by the symbols (♦) and the values for the desorption are indicated by the symbols (▲).

In FIG. 1b, the nitrogen isotherm obtained using the ion-exchanged product of Example 1 is shown. In particular, the step-like curve of a type I adsorption isotherm typical of microporous solids is evident (cf. DIN 66135), indicating that the zeolitic material has open micropores. The evaluation of the data gave an equivalent surface of 680.78 m²/g according to the Langmuir method, and a BET surface area of 520.63 m²/g.

Example 2

A sample of the ion-exchanged zeolitic product from Example 1 was subsequently steam treated at 500° C. with 20% $H_2O$ in nitrogen gas for 1 h at a space velocity W/F=30 g*h/mol to obtain a steam-treated zeolite sample.

Example 3

A portion of the steam-treated zeolite sample from Example 2 was subsequently subject to an acid-treatment procedure wherein 60 ml of 1M nitric acid were added to the zeolite per 1 g of the zeolite, and the resulting mixture was heated to 80° C. under stirring for 3 h to obtain a steam- and acid-treated zeolite sample.

Example 4

The procedure of Example 3 was repeated with a further sample from Example 2, wherein the acid-treatment was conducted for a period of 6 h.

Example 5

The procedure of Example 2 was repeated with a further sample from Example 1, wherein the steam-treatment was conducted at a temperature of 600° C.

Example 6

A portion of the steam-treated zeolite sample from Example 5 was subsequently subject to an acid-treatment procedure wherein 60 ml of 1M nitric acid were added to the zeolite per 1 g of the zeolite, and the resulting mixture was heated to 80° C. under stirring for 3 h to obtain a steam- and acid-treated zeolite sample.

Example 7

The procedure of Example 2 was repeated with a further sample from Example 1, wherein the steam-treatment was conducted at a temperature of 700° C.

Example 8

A portion of the steam-treated zeolite sample from Example 7 was subsequently subject to an acid-treatment procedure wherein 60 ml of 1M nitric acid were added to the zeolite per 1 g of the zeolite, and the resulting mixture was heated to 80° C. under stirring for 3 h to obtain a steam- and acid-treated zeolite sample.

Example 9

332.1 g of $NaAlO_2$ were dissolved in 7.58 kg of $H_2O$, followed by addition of 62.8 g of Al-beta zeolite seed crystals (CP814C zeolite Beta from Zeolyst International). Subsequently, 363.6 g of fumed silica (Aerosil® 200) were slowly added under stirring. The mixture was then transferred to a 20 l autoclave, and 8.063 kg of sodium-water glass solution (26 wt.-% $SiO_2$ and 8 wt.-% $Na_2O$ from Fa. Woellner) were sucked into the autoclave using reduced pressure, wherein the stirring performance initially declined for a short period due to gelation of the mixture. The resulting mixture was then crystallized at 120° C. for 117 h under hydrothermal conditions. After having let the reaction mixture cool to room temperature, it was filtered and the solid residue repeatedly washed with distilled water, after which it was dried at 120° C. for 16 h thus affording 1.33 kg of a white crystalline product. The product displayed a crystallinity grade of 90% compared to the Al-beta zeolite used in synthesis.

Elemental analysis of the crystalline product obtained from hydrothermal synthesis afforded Na:Si:Al molar ratios of 1.0:4.5:1.

Figure 2A:
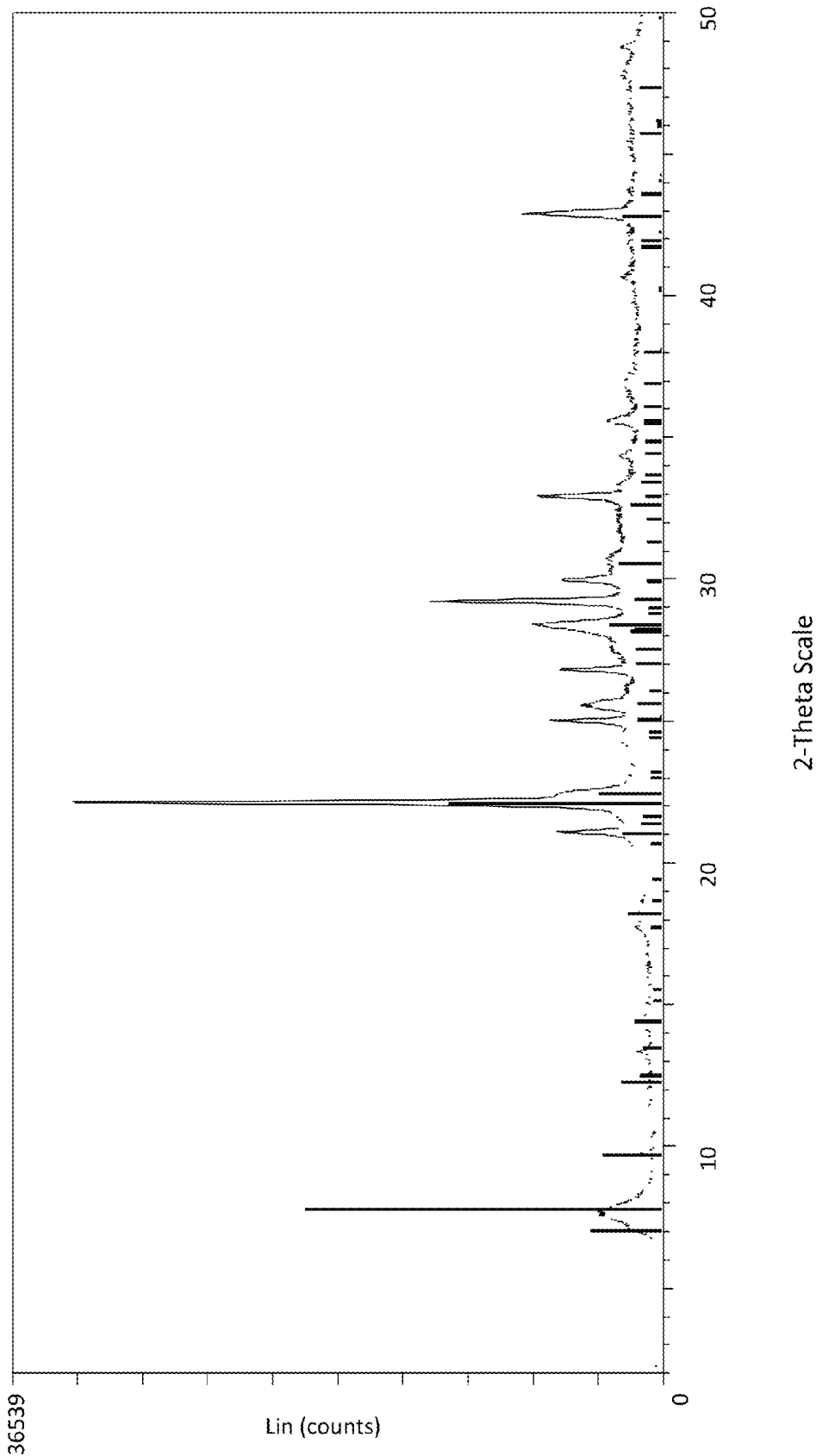
FIG. 2a shows the X-ray diffraction (XRD) pattern (measured using Cu K alpha-1 radiation) of the zeolitic material obtained from hydrothermal synthesis in Example 9. In the figure, the diffraction angle 2 theta in ° is shown along the abscissa and the intensities are plotted along the ordinate.

In FIG. 2a, the XRD of the washed and dried crystalline product obtained from hydrothermal synthesis is displayed. In particular, the XRD pattern is typical for a BEA framework structure.

Figure 2B:
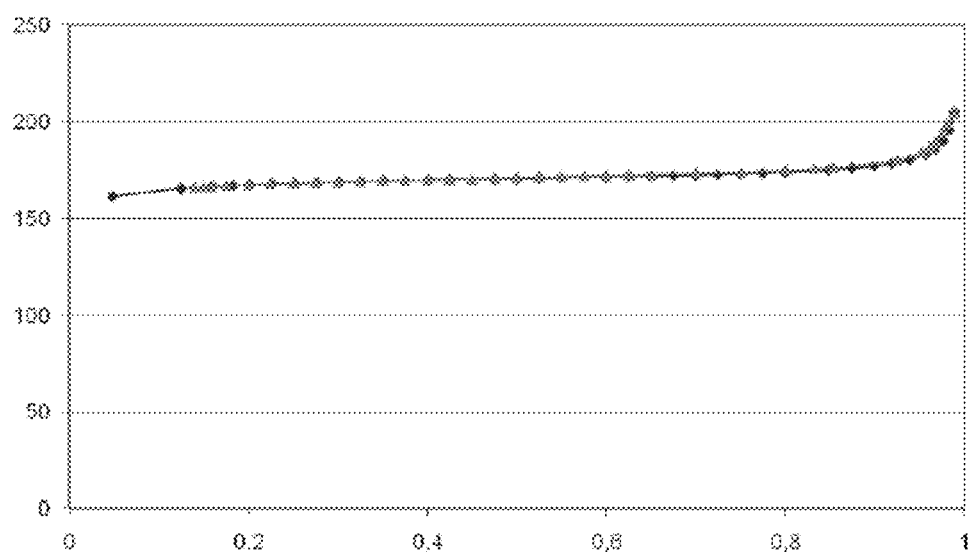
FIG. 2b shows the nitrogen adsorption isotherm of the zeolitic material obtained from hydrothermal synthesis in Example 9. In the figure, the relative pressure p/p° and the pore volume in cm³/g STP (standard pressure and temperature) determined according to DIN 66134 at 77 K are displayed as in FIG. 1b.

In FIG. 2b, the nitrogen isotherm obtained for the washed and dried crystalline product obtained from hydrothermal synthesis is shown. In particular, the step-like curve of a type I adsorption isotherm typical of microporous solids is evident (cf. DIN 66135), indicating that the zeolitic material has open micropores. The evaluation of the data gave an equivalent surface of 741.28 m²/g according to the Langmuir method, and a BET surface area of 529.61 m²/g.

100 g of the washed and dried zeolitic material obtained from hydrothermal synthesis were then added to a solution of 100 g ammonium nitrate dissolved in 100 ml distilled water. The pH of the solution was then adjusted to pH=3 using 3 g of concentrated nitric acid (65%), and the mixture was heated under stirring to 90° C. for 1 h. The hot solution was then filtered and the zeolitic material washed with hot distilled water (50-60° C.). The zeolitic material was then dried at 120° C. The procedure was then repeated twice, without however adding any nitric acid to the mixture prior to heating since the pH was already less than or equal to 3.

After the second repetition of the ion-exchange procedure, the zeolitic material was dried at 150° C. after which 25 wt-% of distilled water were added to the zeolitic material after having let to cool. Subsequently, the zeolitic material was transferred to a porcelain dish which was covered with a second dish and then heated to 620° C. using a heating ramp of 1° C./min and then maintained at 650° C. for 2 h to afford a calcined zeolite.

The ion-exchange procedure and subsequent calcination procedure were repeated a total of two times, wherein the calcination was respectively effected at 680° C., thus affording 65 g of a beige crystalline product displaying a crystallinity grade of 105% compared to Al-beta zeolite used in synthesis.

Elemental analysis of the ion-exchanged crystalline product afforded Na:Si:Al molar ratios of 0.005:7.1:1.

Figure 2C:
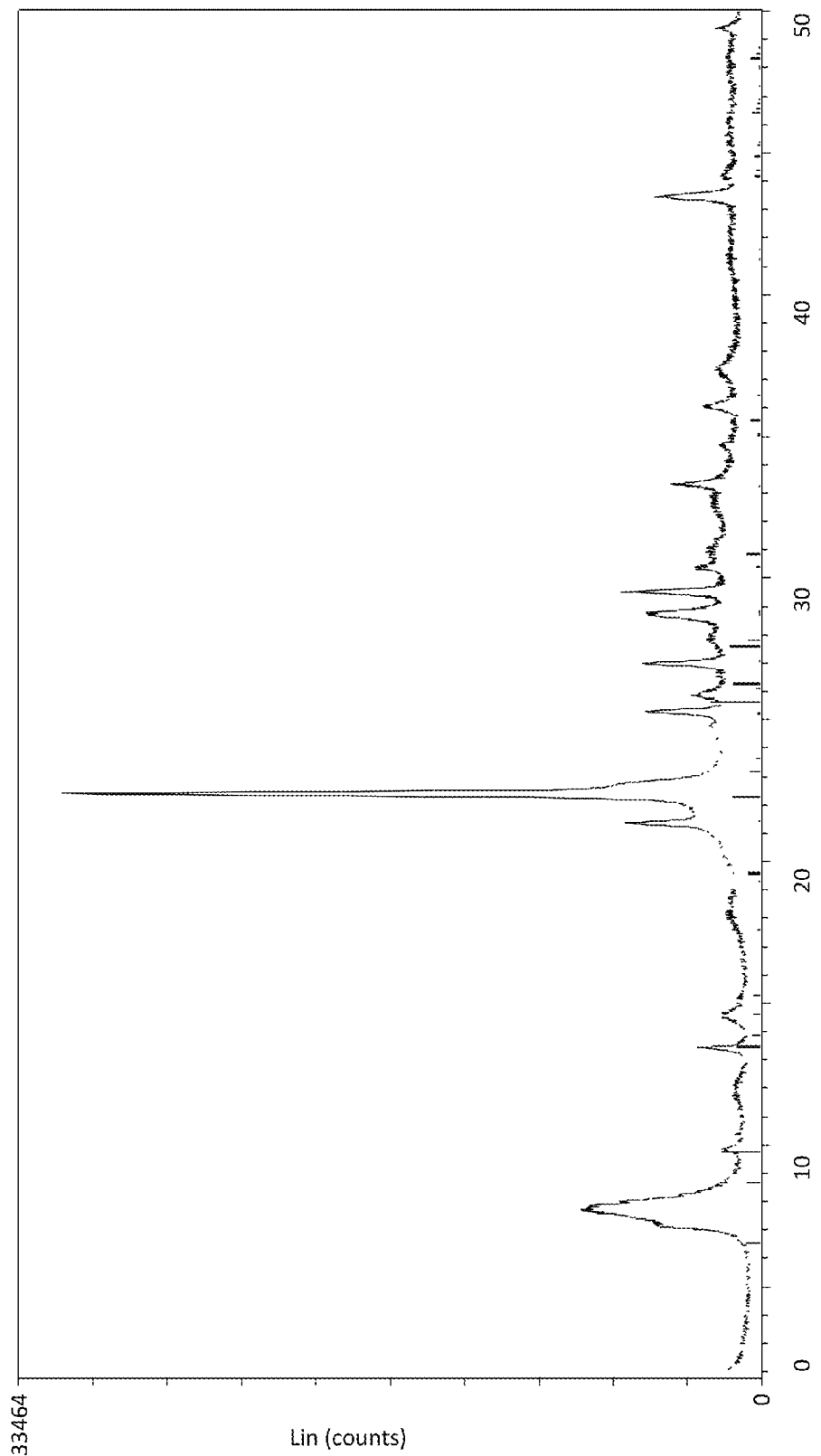
FIG. 2c shows the X-ray diffraction (XRD) pattern (measured using Cu K alpha-1 radiation) of ion-exchanged zeolitic material obtained in Example 9. In the figure, the diffraction angle 2 theta in ° is shown along the abscissa and the intensities are plotted along the ordinate.

In FIG. 2c, the XRD of the ion-exchanged product is displayed. As may be taken from the XRD pattern, the BEA framework structure is still apparent. Furthermore, the (deconvoluted) ¹H MAS NMR spectrum of the ion-exchanged crystalline product is displayed in FIG. 3.

Example 10

For testing the activity of the zeolitic materials according to the present invention in catalyzing acylation reactions, 25 g samples obtained from the foregoing examples were respectively placed in a reactor containing 25 mmol of anisole, and 2.5 mmol of acetic anhydride, wherein the acylation reaction was conducted at a temperature of 60° C. for 5 h. The reaction products were than analyzed with respect to the production of the monoacylation product 4-methoxyacetophenone (p-MAP). The results from catalyst testing performed on the respective samples as well as on a reference zeolite Beta sample (JRC-Z-HB25 supplied by the Catalysis Society of Japan) are displayed in Table 1.

TABLE 1

Results from acylation catalyst testing performed on anisole using acetic anhydride.

| Sample | Steam treatment | Temp. [° C.] | Acid Treatment | Duration [h] | Si:Al - molar ratio | Yield of p-MAP [%] |
|---|---|---|---|---|---|---|
| Example 1 | no | — | no | — | 4.6 | 0 |
| Example 2 | yes | 500 | no | — | 4.7 | 54 |
| Example 3 | yes | 500 | yes | 3 | 48 | 55 |
| Example 4 | yes | 500 | yes | 6 | 58 | 43 |
| Example 5 | yes | 600 | no | — | 4.6 | 40 |
| Example 6 | yes | 600 | yes | 3 | 33 | 57 |
| Example 7 | yes | 700 | no | — | 4.6 | 51 |
| Example 8 | yes | 700 | yes | 3 | 35 | 52 |
| Example 9 | no | — | no | — | 7.1 | 74 |
| Reference | no | — | no | — | 13 | 26 |

Thus, as may be taken from the results displayed in Table 1, the samples of the zeolitic material according to the present invention which have been subject to a dealumination procedure display considerably improved yields with respect to 4-methoxyacetophenone compared to the reference zeolite Beta JRC-Z-HB25. In particular, it may be noted from the Si:Al molar ratios of the various samples used that the overall value thereof in the zeolitic materials is not the determining factor for the performance of the inventive zeolites compared to the reference sample, but rather the dealumination step which directly influences the coordination of the aluminum in the zeolite framework without necessarily changing the overall content thereof in the zeolitic material. This is particularly apparent from the results obtained for the sample from Example 1 which was not subject to a dealumination procedure, since it displays practically no activity in the catalysis of the acylation reaction under the testing conditions employed in Example 10, despite a comparatively low Si:Al molar ratio.

In particular, a potential factor influencing the highly unexpected behavior observed for the inventive samples may reside in the different types of hydroxyl functionalities in- and outside of the zeolitic framework. Thus, as may for example be taken FIG. 3, wherein the (deconvoluted) $^1$H MAS NMR spectrum obtained from the sample of Example 8 is compared to the spectrum obtained from a commercial zeolite Beta, the differences in the occurrence of the different types of hydroxyl groups present in the zeolitic materials is are very pronounced. In particular, although both samples contain hydroxyl groups arising from extra-framework aluminum (0.7-0.9 ppm), single silanols (1.7-1.8 ppm), and aluminum hydroxyls arising from hydrogen-bond effect (2.5-2.7 ppm), the amount of extra-framework aluminum hydroxyls is extremely high in the inventive zeolitic material compared to the commercial sample in which this type of hydroxyls is present only in vanishingly small amounts, if present at all. As may be further taken from FIG. 3, the $^1$H MAS NMR obtained from the sample of Example 1, on the other hand, which as opposed to the inventive examples was not subject to dealumination, contains only very low amounts of the hydroxyl groups attributed to both extra-framework aluminum and single silanols, whereas a signal in the range of 3.8-3.9 ppm which may be attributed to Brønsted acidic sites actually predominates. Consequently, clear structural differences are also observed between the zeolitic material having a BEA framework structure according to the present invention and related zeolitic materials having a comparably low Si:Al ratio, yet which have not been subject to a dealumination step.

Example 11

For testing the selectivity of the zeolitic materials according to the present invention in catalyzing specific acylation reactions, the acylation of 2-methoxynaphthalene with acetic anhydride was performed. To this effect, 2.5 ml chlorobenzene and 50 mg of zeolitic material were placed in a reaction vessel, after which 1 g of acetic anhydride and an equimolar amount of 2-methoxynaphthalene were added. The reaction mixture was then heated to 100° C. for a period of 24 h, after which the reaction products were then analyzed. The results from catalyst testing performed using the inventive zeolitic material of Example 9 and a commercial zeolite Beta (CP814C zeolite Beta from Zeolyst International) are displayed in Table 2.

TABLE 2

Results from acylation catalyst testing performed on 2-methoxynaphthalene using acetic anhydride.

| Sample | conversion of 2-methoxynaphthalene [%] | selectivity towards 2-acetyl-6-methoxynaphthalene [%] |
|---|---|---|
| Example 1 | 0.13 | ≈0 |
| Example 9 | 7.05 | 44.79 |
| Commercial | 6.09 | 15.96 |

Thus, as may be taken from the results displayed in Table 2, the sample of the inventive zeolitic material from Example 9 not only shows an increased activity with respect to the acylation of 2-methoxynaphthalene. Far more interesting is the selectivity of the inventive catalyst towards the 2-acetyl-6-methoxynaphthalene product which is almost 3 times as high as observed using the commercial zeolite Beta material. Accordingly, in addition to an increased activity, a high degree of selectivity and in particular of regioselectivity may be achieved with the zeolitic materials according to the present invention compared to commercial zeolitic materials which—if at all—only show very little regioselectivity.

Accordingly, it has quite unexpectedly been found that novel zeolitic materials having the BEA framework structure with considerably advantageous properties, in particular with respect to their use as a catalyst in chemical reactions and conversions may be provided according to the present invention. In particular, it has been surprisingly been found that such materials may for example be afforded by subjecting Al-rich zeolitic materials to one or more dealumination processes. This comes all the more as a surprise since direct syntheses of zeolitic materials having a low aluminum content are well known, such that it was highly unforeseeable that the indirect preparation of such a material via an aluminum rich material followed by dealumination thereof might lead to a completely different material having unexpected properties as demonstrated in the foregoing.

What is claimed is:
1. A process for the preparation of a zeolitic material having a BEA framework structure comprising the steps of:
(i) providing one or more zeolitic materials having a BEA framework structure, wherein the BEA framework structure comprises $YO_2$ and $X_2O_3$, wherein Y is a tetravalent element, and X is a trivalent element;
(ii) subjecting the one or more zeolitic materials provided in step (i) to a procedure for removing at least a portion of X from the BEA framework structure; wherein the Y:X molar ratios of the one or more zeolitic materials provided in step (i) are respectively comprised in the range of from 1 to 50, and wherein the one or more zeolitic materials provided in step (i) are obtained from an organotemplate-free synthetic process.

2. The process of claim 1, wherein Y is selected from the group consisting of Si, Sn, Ti, Zr, Ge, and combinations of two or more thereof.

3. The process of claim 1, wherein X is selected from the group consisting of Al, B, In, Ga, and combinations of two or more thereof.

4. The process claim 1, wherein the one or more zeolitic materials provided in step (i) are non-calcined.

5. The process of claim 1, wherein the BET surface area determined according to DIN 66135 of the one or more zeolitic materials provided in step (i) ranges from 200 to 700 m$^2$/g.

6. The process of claim 1, wherein the one or more zeolitic materials comprise zeolite Beta.

7. The process of claim 1, wherein the one or more zeolitic materials provided in step (i) comprises one or more alkali metals M.

8. The process of claim 7, wherein the molar ratio of M:X ranges from 0.01 to 20.

9. The process of claim 7, wherein prior to the procedure in step (ii) at least a portion of the alkali metal atoms M contained in the one or more zeolitic materials provided in step (i) is exchanged with H$^+$ and/or NH$_4^+$.

10. The process of claim 7, wherein the ion-exchange process is conducted at a pH in the range of from 0 to 7.

11. The process of claim 1, wherein the procedure in step (ii) for removing at least a portion of X from the BEA framework structure comprises one or more steam-treatment steps (S).

12. The process of claim 11, wherein the one or more steam-treatment steps (S) are conducted at a temperature of from 200 to 1,000° C.

13. The process of claim 11, wherein the one or more steam-treatment steps (S) are conducted for a duration of from 0.1 to 48 h.

14. The process of claim 11, wherein the one or more steam-treatment steps (S) are conducted using a steam concentration of from 5 to 75 vol.-%.

15. The process of claim 11, wherein the procedure in step (ii) further comprises subjecting the one or more zeolitic materials obtained from the one or more steam-treatment steps (S) to one or more acid-treatment steps (A).

16. The process of claim 15, wherein the one or more acid-treatment steps (A) involve contacting the one or more zeolitic materials with an acidic solution having a pH of 4 or less.

17. The process of claim 15, wherein the one or more acid-treatment steps (A) involve contacting the one or more zeolitic materials with an acidic solution at a temperature of from 50 to 100° C.

18. The process of claim 17, wherein the one or more acid-treatment steps (A) involve contacting the one or more zeolitic materials with an acidic solution for a period of from 0.25 to 5 h.

19. The process of claim 1, wherein the procedure in step (ii) for removing at least a portion of X from the BEA framework structure comprises one or more calcination steps (C).

20. The process of claim 19, wherein the one or more calcination steps (C) are conducted at a temperature of from 450 to 800° C.

21. The process of claim 19, wherein the one or more calcination steps (C) are conducted for a period ranging from 0.5 to 10 h.

22. The process of claim 1, wherein step (ii) is repeated one or more times.

23. The process of claim 22, wherein the repetition of step (ii) comprises the repetition of one or more calcination steps (C).

24. The process of claim 22, wherein prior to repeating step (ii), at least part of the non-framework ions respectively present in the one or more zeolitic materials are exchanged with one or more cations and/or cationic elements, wherein the one or more cation and/or cationic elements comprise H$^+$ and/or NH$_4^+$.

25. The process of claim 24, wherein the non-framework ions comprise X.

26. A zeolitic material having a BEA framework structure obtainable and/or obtained according to claim 1.

27. A zeolitic material having a BEA framework structure, optionally obtainable and/or obtained according to claim 1, wherein the BEA framework structure comprises YO$_2$ and X$_2$O$_3$, wherein Y is a tetravalent element, and X is a trivalent element, and wherein the $^1$H MAS NMR of the zeolitic material comprises:

a first peak (P1) in the range of from 0.40 to 1.00 ppm;

a second peak (P2) in the range of from 1.40 to 2.00 ppm; and a third peak (P3) in the range of from 2.30 to 2.90 ppm;

wherein the integration of the first, second, and third peaks in the $^1$H MAS NMR of the zeolitic material offers a ratio of the integration values P1:P2:P3 of 1: (0.5-1.2):(0.30-2.5).

28. The zeolitic material of claim 27, wherein the $^1$H MAS NMR of the zeolitic material does not include a peak in the range of from 3.85 to 3.95 ppm, having an integration value of 100% or more of the integration value of the first, second, and/or third peaks.

29. The zeolitic material of claim 27, wherein Y is selected from the group consisting of Si, Sn, Ti, Zr, Ge, and combinations of two or more thereof.

30. The zeolitic material of claim 27, wherein X is selected from the group consisting of Al, B, In, Ga, and combinations of two or more thereof.

31. The zeolitic material of claim 27, wherein the Y:X molar ratio of the zeolitic material is comprised in the range of from 2 to 60.

32. The zeolitic material of claim 27, wherein the zeolitic material comprises zeolite Beta.

33. The zeolitic material of claim 27, wherein the zeolitic material has an X-ray diffraction pattern comprising at least the following reflections:

| Intensity (%) | Diffraction angle 2θ/° [Cu K(alpha 1)] |
|---|---|
| [8-28] | [21.24-21.44] |
| 100 | [22.28-22.48] |
| [5-25] | [25.18-25.38] |
| [5-25] | [26.88-27.08] |
| [4-24] | [28.62-28.82] |
| [8-28] | [29.42-29.62] |
| [1-21] | [33.09-33.49] |
| [3-23] | [43.28-43.68] | wherein 100% relates to the intensity of the maximum peak in the X-ray powder diffraction pattern.

34. The process of claim 33, wherein the X-ray diffraction pattern comprises the following reflection:

| Intensity (%) | Diffraction angle 2θ/° [Cu K(alpha 1)] |
|---|---|
| [1-17] | [25.77-25.97] |

35. A process for the acylation of an organic compound comprising:
(a) providing a catalyst comprising one or more zeolitic materials having a BEA framework structure,
(b) contacting the catalyst with one or more acylatable organic compounds in the presence of one or more acylating agents in one or more reactors for obtaining one or more acylated organic compounds, wherein the one or more zeolitic materials is a zeolitic material having a BEA framework structure according to claim 27.

36. The process of claim 35, wherein the one or more acylatable organic compounds comprises one or more acylatable aromatic compounds.

37. The process of claim 35, wherein the one or more acylating agents comprise one or more compounds of the formula $R^1$—CO—X, wherein —CO— stands for a carbonyl moiety; $R^1$ is optionally substituted linear or branched, saturated or unsaturated $C_1$ to $C_8$; and X is selected among the group consisting of halogen, hydroxyl, and —O—CO—$R^2$, wherein $R^2$ has the same meaning as $R^1$ and wherein $R^2$ may be identical to or different than $R^1$.

38. A method comprising the step of contacting one or more organic compounds with a zeolitic material having a BEA framework structure according to claim 27 for catalyzing a chemical reaction between one or more of the organic compounds.

39. The method of claim 38, wherein the conversion of the one or more organic compounds is an acylation reaction.

\* \* \* \* \*